United States Patent
Kim et al.

(10) Patent No.: US 10,540,041 B2
(45) Date of Patent: Jan. 21, 2020

(54) TOUCH PROCESSOR, TOUCH DISPLAY DRIVER INTEGRATED CIRCUIT CHIP INCLUDING TOUCH PROCESSOR, AND METHOD OF OPERATING TOUCH PROCESSOR

(71) Applicant: SAMSUNG ELECTRONICS CO., LTD., Suwon-si, Gyeonggi-do (KR)

(72) Inventors: Jin-Bong Kim, Yongin-si (KR); Yoon-Kyung Choi, Seoul (KR); Min-Sung Kim, Suwon-si (KR); San-Ho Byun, Bucheon-si (KR); Hwi-Taek Chung, Yongin-si (KR); Eung-Man Kim, Suwon-si (KR); Cha-Dong Kim, Gwacheon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 339 days.

(21) Appl. No.: 15/405,343

(22) Filed: Jan. 13, 2017

(65) Prior Publication Data
US 2017/0212636 A1    Jul. 27, 2017

(30) Foreign Application Priority Data
Jan. 22, 2016 (KR) .......... 10-2016-0008039

(51) Int. Cl.
*G06F 3/041*      (2006.01)
*G09G 3/20*       (2006.01)
*G06F 3/044*      (2006.01)

(52) U.S. Cl.
CPC .......... *G06F 3/0418* (2013.01); *G06F 3/044* (2013.01); *G06F 3/0412* (2013.01); *G09G 3/20* (2013.01)

(58) Field of Classification Search
CPC ...... G06F 3/0418; G06F 3/0412; G06F 3/044; G09G 3/20
USPC .......................................... 345/174
See application file for complete search history.

(56) References Cited

U.S. PATENT DOCUMENTS

| 8,872,789 B2 | 10/2014 | Lee |
| 9,007,343 B1 | 4/2015 | Ludden |
| 2011/0273399 A1* | 11/2011 | Lee ............ G06F 3/0418 345/174 |

(Continued)

FOREIGN PATENT DOCUMENTS

| KR | 10-1461926 | 11/2014 |
| KR | 10-1514517 | 4/2015 |

(Continued)

*Primary Examiner* — Amare Mengistu
*Assistant Examiner* — Gloryvid Figueroa-Gibson
(74) *Attorney, Agent, or Firm* — Volentine, Whitt & Francos, PLLC

(57) ABSTRACT

Provided are a touch processor for performing active protection, a touch display driver integrated circuit (DDI) chip including the touch processor, and a method of operating the touch processor. The touch processor for driving a touch panel including a sensing cell includes a driving circuit configured to provide a driving signal to the touch panel, and a capacitance controller. The capacitance controller is configured to generate a switch control signal for controlling a switch connected to a sensing unit included in the sensing cell, and a compensation signal having a different waveform than the driving signal, so as to reduce a value of an ambient capacitance component of the sensing cell.

20 Claims, 33 Drawing Sheets

(56) References Cited

U.S. PATENT DOCUMENTS

| | | |
|---|---|---|
| 2013/0162595 A1 | 6/2013 | Lee |
| 2014/0375609 A1 | 12/2014 | Kim |
| 2015/0091843 A1* | 4/2015 | Ludden .................. G06F 3/044 345/174 |
| 2016/0283023 A1 | 9/2016 | Shin et al. |

FOREIGN PATENT DOCUMENTS

| | | |
|---|---|---|
| KR | 10-2015-0055569 | 5/2015 |
| KR | 10-2015-0081574 | 7/2015 |
| KR | 10-1537229 | 7/2015 |

* cited by examiner ns, and provides touch information corresponding to the detection of the corresponding object. Touch panels may be classified into in-cell type touch panels and on-cell type touch panels, depending on the type of implementation which is employed.

TOUCH PROCESSOR, TOUCH DISPLAY DRIVER INTEGRATED CIRCUIT CHIP INCLUDING TOUCH PROCESSOR, AND METHOD OF OPERATING TOUCH PROCESSOR

CROSS-REFERENCE TO RELATED APPLICATION

This application claims the benefit of Korean Patent Application No. 10-2016-0008039, filed on Jan. 22, 2016, in the Korean Intellectual Property Office, the disclosure of which is incorporated herein in its entirety by reference.

BACKGROUND

The inventive concept relates to a touch processor, and more particularly, to a touch processor that performs active protection, a touch display driver integrated circuit (DDI) chip including the touch processor, and a method of operating the touch processor.

A touch processing system detects an object that approaches or contacts a touch panel including sensing units, and provides touch information corresponding to the detection of the corresponding object. Touch panels may be classified into in-cell type touch panels and on-cell type touch panels, depending on the type of implementation which is employed.

A value of an ambient capacitance component may increase between sensing units and various electrodes related to display driving. This may reduce a dynamic range during touch sensing. Therefore, there is a need for reducing the value of the ambient capacitance component so as to improve the performance of the touch processing system.

SUMMARY

The inventive concept a touch processor for driving a touch panel so as to reduce ambient capacitances components caused by various electrodes, a touch display driver integrated circuit (DDI) chip including the touch processor, and a method of operating the touch processor.

According to an aspect of the inventive concept, there is provided a touch processor for driving a touch panel including a sensing cell, the touch processor including a driving circuit configured to provide a driving signal to the touch panel, and a capacitance controller configured to generate a switch control signal for controlling a switch connected to a sensing unit included in the sensing cell, and at least a first compensation signal having a different waveform than the driving signal, so as to reduce a value of at least a first ambient capacitance component of the sensing cell.

According to another aspect of the inventive concept, there is provided a touch DDI chip for a display panel including a touch panel, the touch DDI chip including a display driver configured to drive the display panel through at least one gate line and at least one data line, and a touch processor configured to provide a driving signal to the touch panel and generate touch information based on a sensing signal output by the touch panel, wherein the touch DDI chip provides at least a first compensation signal to the display panel, the first compensation signal having a waveform which is different than a waveform of the driving signal, and the waveform of the at least one compensation signal being determined according to a parasitic component of a cell switch of the display panel.

According to a further aspect of the inventive concept, there is provided a method of operating a touch processor for driving a touch panel, the touch panel including at least one selected from among electrodes related to display driving as a sensing unit, the method including providing a driving signal to the sensing unit in a touch sensing period, providing, to a switch connected to the sensing unit, a switch control signal for turning off the switch, generating a compensation signal having a different waveform than the driving signal by processing the driving signal, and providing the compensation signal to at least one first electrode, a first ambient capacitance component being formed between the at least one first electrode and the sensing unit.

According to yet another aspect of the inventive concept, there is provided a display system including a display panel including an in-cell type touch panel that uses a first electrode as a sensing unit and a touch display driver integrated circuit (DDI) chip including a display driver configured to drive the display panel to produce an image, and a touch processor configured to drive the touch panel, wherein the touch DDI chip includes a driving circuit configured to generate a driving signal that is provided to the sensing unit in a touch sensing period, and a capacitance controller configured to receive and process the driving signal, to generate a switch control signal that is provided to a second electrode so as to turn off a cell switch connected to the sensing unit, and to generate at least a first compensation signal that is provided to a third electrode so as to reduce a value of an ambient capacitance component between the sensing unit and the third electrode.

According to still another aspect of the inventive concept, a device comprises: a driver configured to supply a driving signal to a sensing cell of a touch panel, the sensing cell being configured to detect an object that approaches or contacts the touch panel, and to provide touch information indicating detection of the object; a switch controller configured to turn off a switch associated with the sensing cell during a period for sensing a touch of the touch panel; and a compensation signal generator configured to generate at least a first compensation signal and to apply the first compensation signal to the sensing cell such that signals applied across a first ambient capacitance component of the switching cell have substantially a same waveform as each other, so as to reduce a value of the first ambient capacitance component of the sensing cell during a period for sensing a touch of the touch panel.

BRIEF DESCRIPTION OF THE DRAWINGS

Embodiments of the inventive concept will be more clearly understood from the following detailed description taken in conjunction with the accompanying drawings.

DETAILED DESCRIPTION OF THE EMBODIMENTS

Hereinafter, embodiments will be described in detail with reference to the accompanying drawings.

Figure 1:
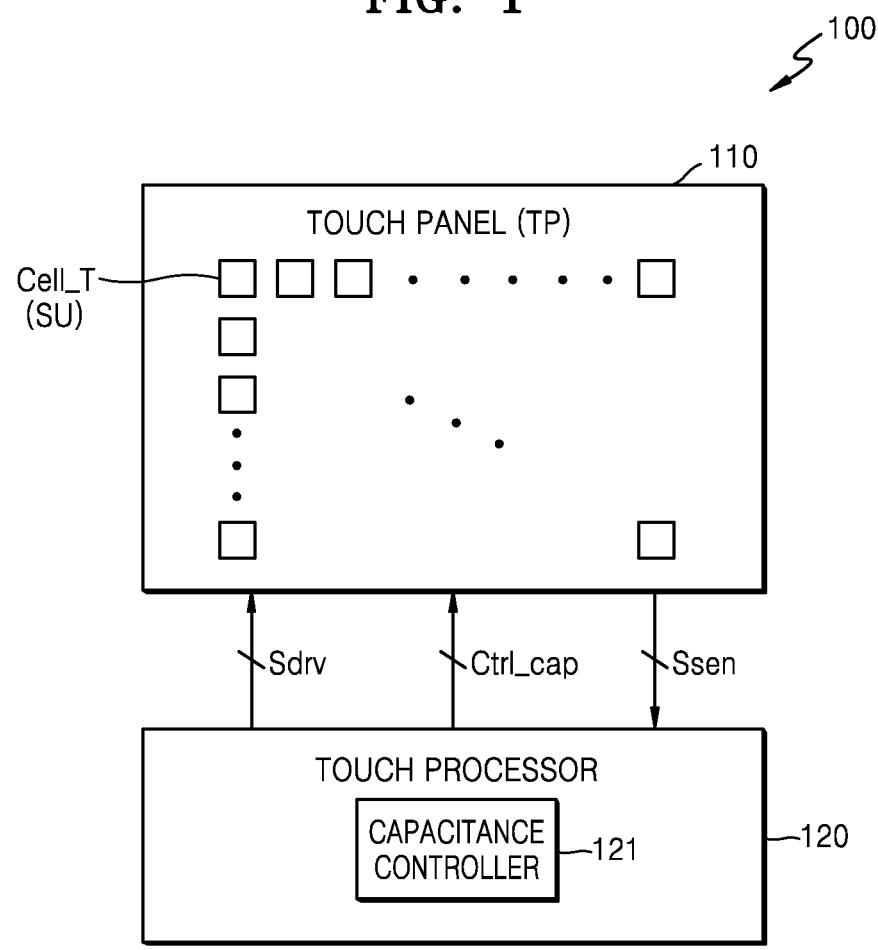
FIG. 1 is a block diagram of a touch processing system according to an embodiment.

FIG. 1 is a block diagram of a touch processing system 100 according to an embodiment.

Referring to FIG. 1, touch processing system 100 may include a touch panel 110 and a touch processor 120.

Touch panel 110 may include a plurality of sensing cells Cell_T. When a touch input occurs on touch panel 110, for example, when an object (or a conductive object), such as a finger, a touch pen, or a stylus pen, approaches or contacts touch panel 110, touch processor 120 may sense a touch by detecting a change in a signal output from touch panel 110. According to some embodiments, touch processing system 100 may be a capacitive sensing system. Alternatively, touch processing system 100 may be implemented by a transparent-electrode sensing system, or a resistive sensing system.

Touch panel 110 may include sensing units arranged in various forms. The sensing units may be respectively implemented by sensor electrodes arranged in touch panel 110. The sensor electrode may include a transparent conductive material, such as indium tin oxide (ITO), indium zinc oxide (IZO), or indium tin zinc oxide (ITZO).

Touch panel 110 may be implemented to have various configurations. For example, touch panel 110, which is implemented to include a plurality of sensing units, may be attached to one side of a display panel (not illustrated) so that touch panel 110 produces an image. Alternatively, touch panel 110 may be implemented inside the display panel (not illustrated), and sensing units included in touch panel 110 may be implemented by at least one selected from among various electrodes included in the display panel (not illustrated). For example, the display panel may include various types of electrodes, such as a common voltage (VCOM) electrode, a gate line electrode, and a data line electrode. For example, the common voltage electrode may be used as the sensing unit of touch panel 110.

Touch processor 120 may apply a driving signal Sdrv to touch panel 110 and may sense a touch by analyzing a sensing signal Ssen, a waveform of which changes according to a touch input. Also, touch processor 120 may generate touch information indicating a touch or non-touch, and in the case of a touch a touch position, based on a result of the sensing.

Furthermore, touch processor 120 may determine a touch input according to other various processing methods. For example, touch processor 120 may apply the driving signal Sdrv to touch panel 110, determine a change in capacitances of the sensing units by determining an amount of charge required for charging the sensing units to a voltage level of the driving signal Sdrv, and generate touch information indicating the touch or non-touch, and the touch position, based on the determined change in capacitances.

Touch processor 120 may drive touch panel 110 according to various methods. For example, touch processor 120 may drive touch panel 110 according to a mutual capacitive method. In the mutual capacitive method, some of the sensing units of touch panel 110 may be used as driving electrodes, and others may be used as sensing electrodes. For example, touch processor 120 may apply the driving signal Sdrv to the driving electrodes and receive the sensing signal Ssen from the sensing electrodes. In the presence of the touch input, a mutual capacitance between the driving electrode and the sensing electrode may vary, and the touch input may be sensed by analyzing the sensing signal Ssen, the waveform of which changes according to a variation in the mutual capacitance between the driving electrode and the sensing electrode.

According to an embodiment, touch processor 120 may drive touch panel 110 according to a self capacitive method. In the self capacitive method, each of the sensing units may be a driving electrode and a sensing electrode. Touch processor 120 may apply the driving signal Sdrv to the sensing units and receive the sensing signal Ssen from the corresponding sensing units. In the presence of the touch input, a self capacitance of the sensing unit may vary, and the touch input may be sensed by analyzing the sensing signal Ssen, the waveform of which changes according to a variation in the self capacitance of the sensing unit.

The sensing cell Cell_T illustrated in FIG. 1 may be variously defined. For example, in a case where touch panel 110 is driven according to the mutual capacitive method, each of the sensing cells Cell_T may be defined as including a sensing unit serving as the driving electrode and a sensing unit serving as the sensing electrode. Alternatively, in a case where touch panel 110 is driven according to the self capacitive method, each of the sensing cells Cell_T may be defined as including a single sensing unit.

When the touch input is provided to touch panel 110, the capacitances of the sensing cells Cell_T vary in a manner such that the capacitances of the sensing cells Cell_T increase or decrease. Also, each of the sensing cells Cell_T may fundamentally include various types of parasitic capacitance components. The parasitic capacitance components are capacitance components fundamentally included in each of the sensing units Cell_T, besides a variation amount of a capacitance caused by the touch input. The parasitic capacitance components may also be referred to as ambient capacitance components.

Touch processor 120 may sense the touch input based on a capacitance value which includes a value of the ambient capacitance component. When the value of the ambient capacitance component is large, the capacitance value varying due to the touch input is relatively reduced, as compared with the ambient capacitance component. In this case, sensitivity or a dynamic range as touch input sensing performance may be reduced.

According to an embodiment, touch processor 120 may include a capacitance controller 121 configured to reduce a value of the ambient capacitance component occurring in the sensing cells Cell_T of touch panel 110. Also, under control of capacitance controller 121, touch processor 120 may output a capacitance control signal Ctrl_cap for reducing the value of the ambient capacitance component occurring in the sensing cells Cell_T of touch panel 110. The capacitance control signal Ctrl_cap may include various types of control signals that affect the value of the ambient capacitance component.

According to an embodiment, in order to reduce a capacitance value at an input terminal of the sensing cell Cell_T, a switch (not illustrated) may be connected to one terminal of the sensing unit. The switch may be turned off in a touch sensing period. The capacitance control signal Ctrl_cap may include a switch control signal for turning off the switch. In this case, capacitance controller 121 may include a signal generator (not illustrated) configured to generate the switch control signal.

According to an embodiment, touch processor 120 may provide a voltage signal or a current signal having AC characteristics to touch panel 110, so as to minimize the influence of the ambient capacitance component by applying signals (e.g., voltage signals) having substantially the same waveform as each other to both terminals of the ambient capacitance component. For example, in a case where the ambient capacitance component is generated by an electrode disposed adjacent to the sensing unit, a compensation signal may be provided to the adjacent electrode. In this case, touch processor 120 may include a compensation signal generator (not illustrated), and the capacitance control signal Ctrl_cap may include the compensation signal. In this case, capacitance controller 121 may include a signal generator (not illustrated) configured to generate the compensation signal.

According to an embodiment, a certain processing operation may be performed in the process of generating the compensation signal, so as to apply the signals having substantially the same waveform as each other to both terminals of the ambient capacitance component. For example, the compensation signal may be generated by using the driving signal Sdrv for driving the sensing cell Cell_T, and the compensation signal generator (not illustrated) may include a processor configured to change at least one characteristic selected from among an amplitude, a phase, and a frequency of the driving signal Sdrv.

As described above, touch panel 110 may be variously implemented, for example, as an on-cell type touch panel or as an in-cell type touch panel. Therefore, the elements included in touch processor 120 illustrated in FIG. 1 may be variously defined. For example, the capacitance control signal Ctrl_cap may include the switch control signal and the compensation signal, and touch processor 120 may be connected to a control electrode of the switch, which is included in touch panel 110, and an electrode, to which the compensation signal is applied, via separate conductive lines. Touch processor 120 may provide the capacitance control signal Ctrl_cap via the separate conductive lines.

Alternatively, touch processor 120 illustrated in FIG. 1 may be implemented by a chip configured to drive a display panel including touch panel 110. Touch processor 120 may be referred to as a touch display driver integrated circuit chip (touch DDI chip or TDDI chip). The touch DDI chip may include a display driver related to display driving, and a touch processor related to touch sensing. According to the implementation type of touch panel 110, the capacitance control signal Ctrl_cap may be output by the display driver and/or the touch processor. For example, in a case where the control electrode of the switch, which is included in touch panel 110, and the electrode, to which the compensation signal is applied, are connected to the display driver, the capacitance control signal Ctrl_cap may be output by the display driver. According to an embodiment, the signals related to the generation of the capacitance control signal Ctrl_cap may be transmitted and received between the display driver and the touch processor.

When the value of the ambient capacitance component decreases, power consumption occurring when touch panel 110 is driven may be reduced. Also, sensitivity of the touch sensing may be improved and a signal-to-noise ratio (SNR) may be improved. Since the value of the ambient capacitance component of the sensing cell Cell_T decreases, a capacitance required to be compensated for by touch panel 110 may be reduced. Accordingly, a size of an IC chip including touch processor 120 may be reduced.

In the above embodiment, an example in which touch processing system 100 operates according to the capacitive method has been described, but embodiments are not limited thereto. For example, various sensing methods, such as a resistive film, infrared light, and a surface acoustic wave, may be applied to touch processing system 100.

Figure 2A:
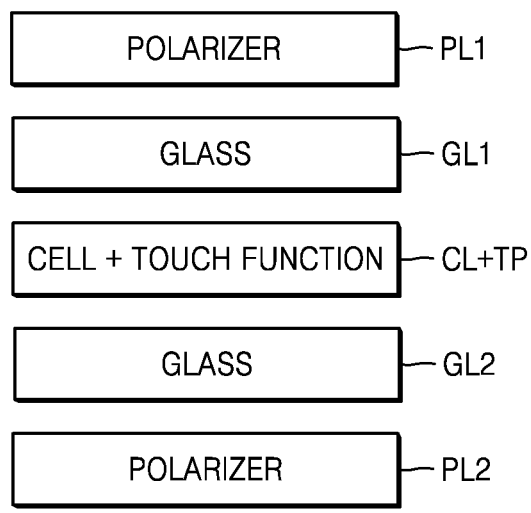
FIGS. 2A and 2B are block diagrams illustrating various examples of a touch panel of FIG. 1.
Figure 2B:
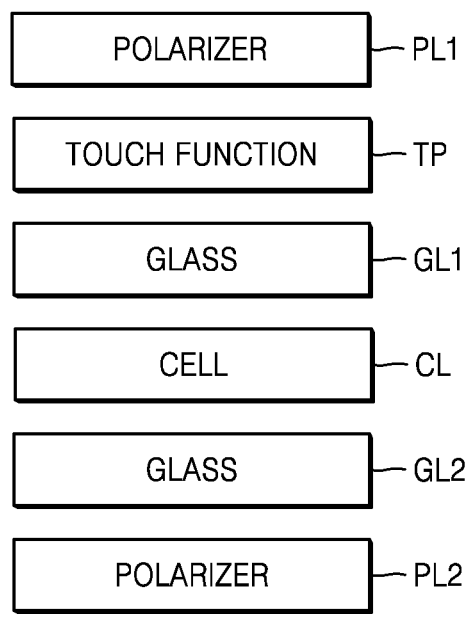

FIGS. 2A and 2B are block diagrams illustrating various examples of the touch panel TP of FIG. 1. FIGS. 2A and 2B illustrate examples of arrangement of elements PL1, GL1, CL, GL2, and PL2 included in the touch panel TP and the display panel.

As illustrated in FIG. 2A, the touch panel TP including sensing units configured to perform a touch function may be provided in a layer CL including a display cell. The touch panel TP may include, as the sensing unit, at least one selected from among various electrodes included in the display panel. For example, a common voltage electrode configured to provide a common voltage (VCOM) during display driving may be used as the sensing unit. A layer CL+TP including the display cell and the touch panel may be disposed between glasses GL1 and GL2. Polarizers PL1 and PL2 may be respectively attached to the glasses GL1 and GL2. The touch panel TP illustrated in FIG. 2A may be referred to as an in-cell type touch panel.

In the in-cell type touch panel TP, the sensing units respectively provided in the sensing cells may be connected to parasitic capacitance components caused by various electrodes related to the display driving. For example, in the in-cell type touch panel TP, a common voltage electrode may be disposed adjacent to a cell switch, a gate line, and a data line of the display cell, and the ambient capacitance component occurring in the sensing cell may include parasitic capacitance components caused by the cell switch, the gate line, and the data line.

As illustrated in FIG. 2B, the touch panel TP manufactured by forming separate sensing units may be attached to some of the elements PL1, GL1, CL, GL2, and PL2 included in the display panel. For example, the touch panel TP may be attached between the upper polarizer PL1 and the upper glass GL1. The touch panel TP illustrated in FIG. 2B may be referred to as an on-cell type touch panel.

Figure 3A:
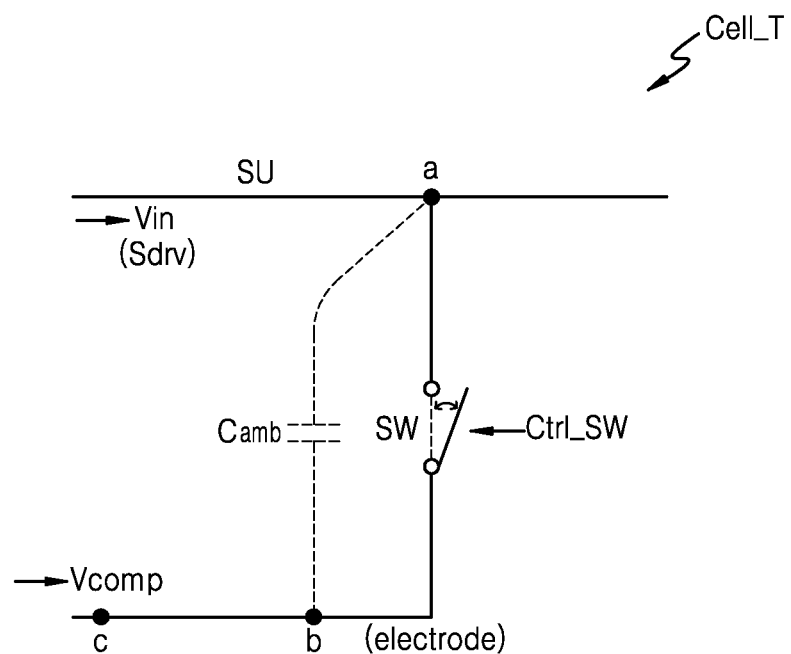
FIGS. 3A, 3B and 3C are circuit diagrams illustrating an example of driving a sensing cell of FIG. 1.
Figure 3B:
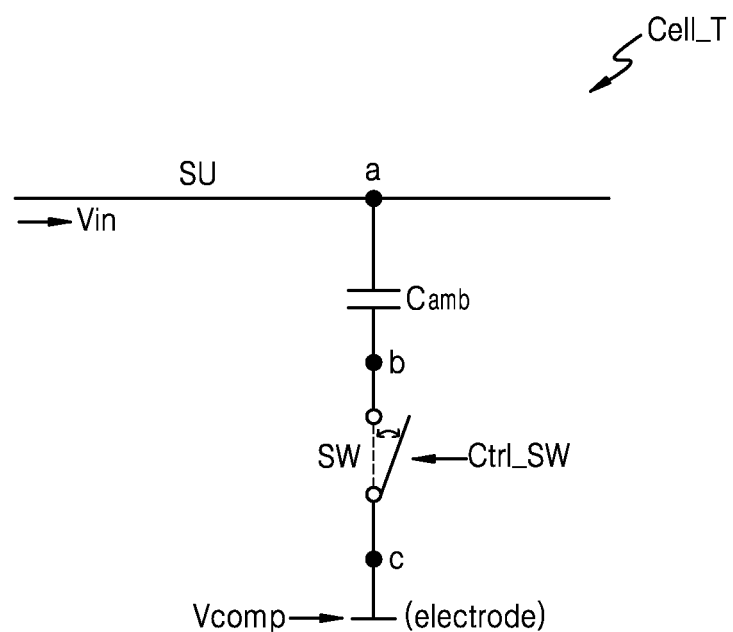
Figure 3C:
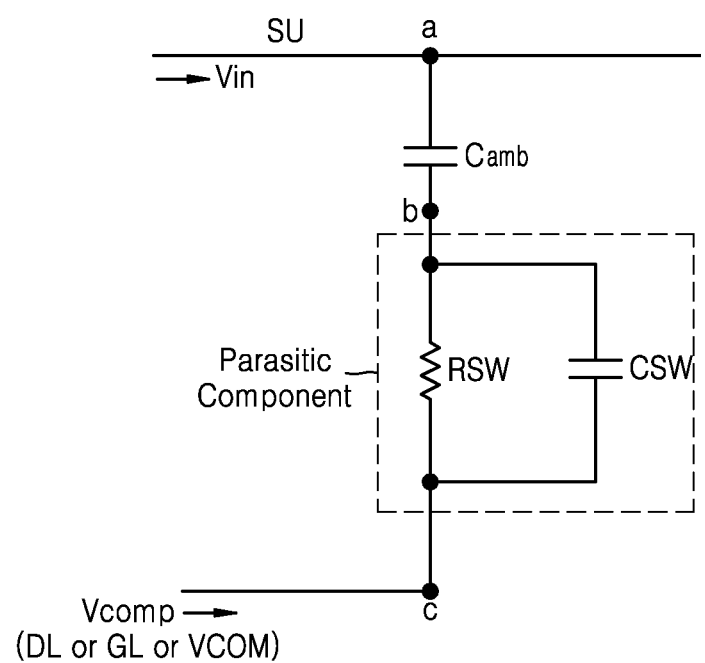

FIGS. 3A, 3B and 3C are circuit diagrams illustrating an example of driving the sensing cell Cell_T of FIG. 1. In the following descriptions of embodiments, the sensing cell Cell_T is defined as including a sensing unit SU and various elements or components (e.g., a switch, an ambient capacitance component caused by adjacent electrodes, etc.) that are connectable to the sensing unit SU.

Referring to FIG. 3A, a driving signal Sdrv is provided to an input terminal of the sensing cell Cell_T so as to drive the sensing cell Cell_T. Because the driving signal Sdrv corresponds to a signal provided to the input terminal of the sensing cell Cell_T, the driving signal Sdrv will be referred to as an input signal Vin in the following description.

A switch SW may be provided in the sensing cell Cell_T, and an ambient capacitance component Camb may correspond to a parasitic capacitance component formed between the sensing unit SU and an electrode adjacent thereto. The input signal Vin may be provided to a first terminal a corresponding to the sensing unit SU, and a compensation signal Vcomp may be provided to a third node c on the electrode adjacent to the sensing unit SU. Both terminals of the ambient capacitance component Camb may correspond to the first node a and a second node b, respectively, and the second terminal b and the third terminal c may be nodes on the electrode adjacent to the sensing unit SU.

The sensing cell Cell_T illustrated in FIG. 3A may be modeled into a circuit configuration illustrated in FIG. 3B. Detailed operations related to the driving of the sensing cell Cell_T will be described below with reference to FIG. 3B.

Referring to FIG. 3B, the switch SW may be turned off in a touch driving period so that an impedance at the input terminal of the sensing cell Cell_T has a high-impedance state. When the switch SW is turned off, the impedance at the input terminal of the sensing cell Cell_T may ideally have an infinite value. Therefore, the capacitance value (e.g., a value of the ambient capacitance component) at the input terminal of the sensing cell Cell_T may be made to be very small, for example, substantially zero. A capacitance control signal Ctrl_cap may include a switch control signal Ctrl_SW that controls the switch SW of the sensing cell Cell_T to be turned off in the touch driving period.

Even though the switch SW is turned off, the switch SW does not ideally operate. Thus, a parasitic component caused by the switch SW inevitably exists. For example, a parasitic resistance component RSW and a parasitic capacitance component CSW caused by the switch SW that is in a turned-off state exist as illustrated in FIG. 3C. In this case, when looking from the terminal to which the compensation signal Vcomp is input, the parasitic component caused by the switch SW exists. Therefore, even though the third terminal c is driven by using the compensation signal Vcomp, one terminal (e.g., the second terminal b) of the ambient capacitance component Camb has a different waveform than the compensation signal Vcomp due to the parasitic component of the switch SW that is in the turned-off state.

According to an embodiment, an active shield method may be applied so as to effectively remove the ambient capacitance component Camb, in spite of the parasitic component of the switch SW. For example, by applying signals having substantially the same waveform as each other to both terminals a and b of the ambient capacitance component Camb, the sensing cell Cell_T may be driven so that the ambient capacitance component Camb at the input terminal thereof is removed.

According to an embodiment, the waveform of the compensation signal Vcomp may be determined taking into account the parasitic component of the switch SW. For example, the compensation signal Vcomp applied to the third terminal c may be provided to the second terminal b after changing an amplitude and a phase of the compensation signal Vcomp based on the parasitic component of the switch SW. In generating the compensation signal Vcomp, a signal having a different waveform than the input signal Vin may be generated as the compensation signal Vcomp by performing an amplification operation, a delay operation, and a filtering operation on a certain signal. By applying the signals having substantially the same waveform as each other to both terminals of the ambient capacitance component Camb, the ambient capacitance component Camb at the input terminal may be effectively removed.

The compensation signal Vcomp may be provided to various electrodes that are connected to the sensing unit SU and cause parasitic capacitance. For example, as illustrated in FIG. 3C, the electrode may be a gate line GL, a data line DL, or a common voltage electrode (VCOM), each of which is related to display driving. According to an embodiment, the compensation signal Vcomp may be provided to at least one selected from among the gate line GL, the data line DL, and the common voltage electrode. Alternatively, according to an embodiment, the compensation signal Vcomp may be provided to all of the gate line GL, the data line DL, and the common voltage electrode. Also, according to an embodiment, characteristics of parasitic components looking from adjacent electrodes may be different from one another, and thus, the compensation signals Vcomp provided to the respective electrodes may have different waveforms.

Figure 4:
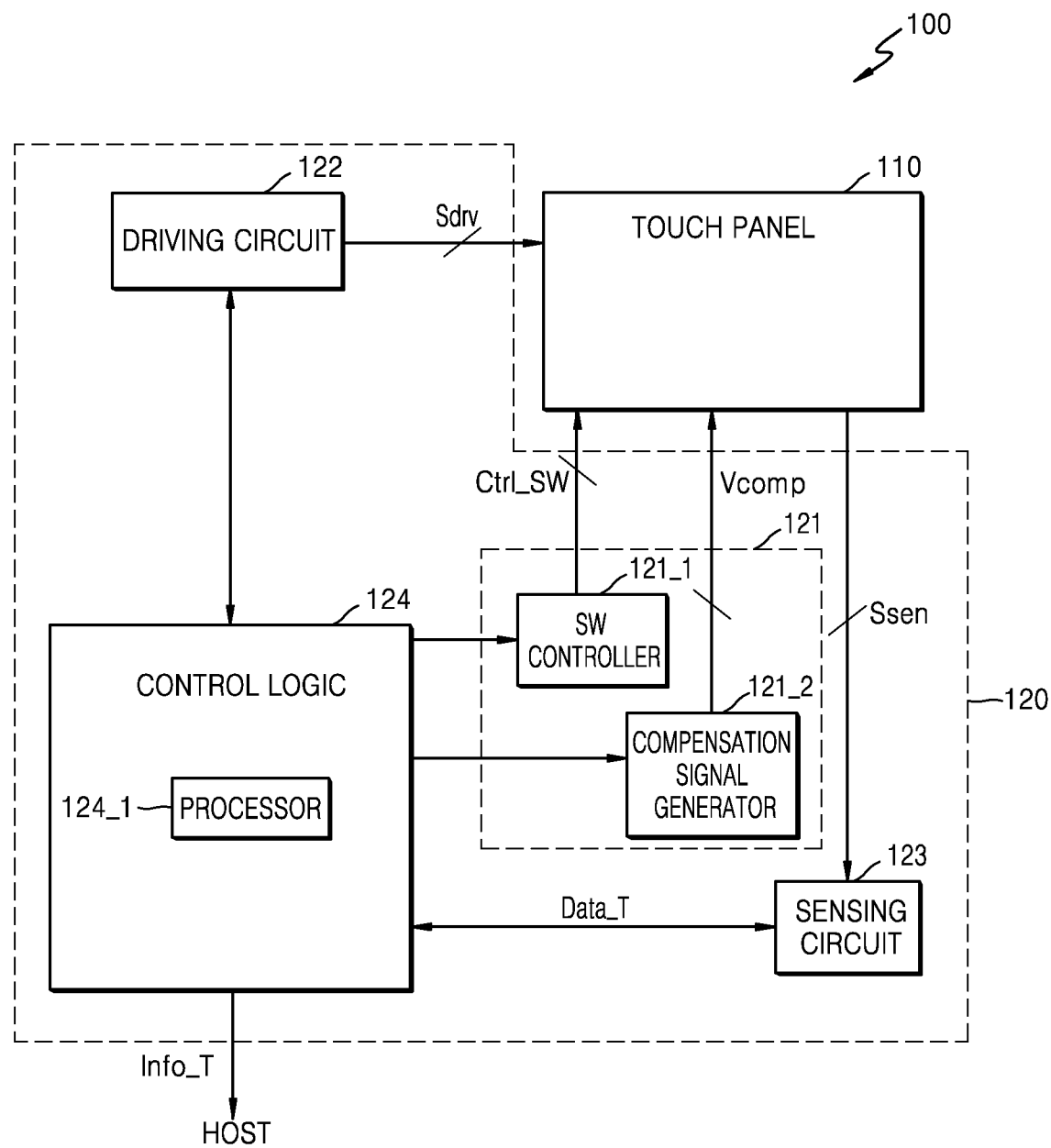
FIG. 4 is a block diagram illustrating an example of a touch processor of FIG. 1.

FIG. 4 is a block diagram illustrating an example of touch processor 120 of FIG. 1.

Referring to FIG. 4, touch processing system 100 may include touch panel 110 and touch processor 120. Touch processor 120 may include a capacitance controller 121, a driving circuit 122, a sensing circuit 123, and a control logic 124. According to an embodiment, capacitance controller 121 may include a switch controller 121_1 and a compensation signal generator 121_2. Control logic 124 may include a processor 124_1.

Driving circuit 122 may generate a driving signal Sdrv and provide the generated driving signal Sdrv to touch panel 110. Driving circuit 122 may include a signal modulator (not illustrated), and driving circuit 122 may generate an AC signal having a certain amplitude and frequency as the driving signal Sdrv through a signal modulation process. Sensing circuit 123 may receive a sensing signal Ssen generated based on the driving signal Sdrv by touch panel 110, and in response thereto provide touch data Data_T to control logic 124 as a result of processing the received sensing signal Ssen. Processor 124_1 may perform a certain logic operation on the touch data Data_T, generate touch information Info_T about a touch or non-touch, and touch coordinates in the case of a touch, as a result of performing the certain logic operation, and provide the touch information Info_T to a host.

According to an embodiment, touch processor 120 may generate a capacitance control signal for reducing ambient capacitance components included in the sensing cells of touch panel 110. For example, as the capacitance control signal related to the ambient capacitance component, a switch control signal Ctrl_SW for controlling the switch of the sensing cell and a compensation signal Vcomp applied to an electrode adjacent to the sensing unit, may be provided to touch panel 110.

According to an embodiment, in a touch sensing period, touch panel 110 may be driven according to various methods based on the switch control signal Ctrl_SW and the compensation signal Vcomp. For example, touch panel 110 may include a plurality of sensing cells arranged in a matrix configuration along a plurality of rows and a plurality of columns A plurality of sensing cells may be arranged corresponding to one row, and a plurality of sensing cells may be arranged corresponding to one column.

As an example of driving, rows of the sensing cells may be electrically connected to row lines of touch panel 110, and the switch control signal Ctrl_SW may be provided to the sensing cells through the row lines. Also, columns of the sensing cells may be electrically connected to column lines of touch panel 110, and the compensation signal Vcomp may be provided to the sensing cells through the column lines.

For example, by equally providing the switch control signal Ctrl_SW to all of the rows, the switch control signal Ctrl_SW may be simultaneously provided to all of the sensing cells of touch panel 110. Also, by equally providing the compensation signal Vcomp to all of the columns, the compensation signal Vcomp may be simultaneously provided to all of the sensing cells of touch panel 110. However, embodiments are not limited thereto. By sequentially driving the plurality of row lines, the switch control signal Ctrl_SW may be sequentially provided to the row lines. Similarly, by sequentially driving the plurality of column lines, the compensation signal Vcomp may be sequentially provided to the column lines.

According to the embodiment described above, the sensing cells may be made to have a high-impedance state by turning off the switches of the sensing cells in the touch sensing period, and thus, the value of the ambient capacitance component at the input terminals of the sensing cells may be reduced, thereby improving touch sensing sensitivity. Also, even though the switches do not ideally operate, and therefore parasitic components caused by the switches exist, the influence from the parasitic components of the switches may be minimized through the above-described active shield operation using the compensation signal Vcomp.

Figure 5:
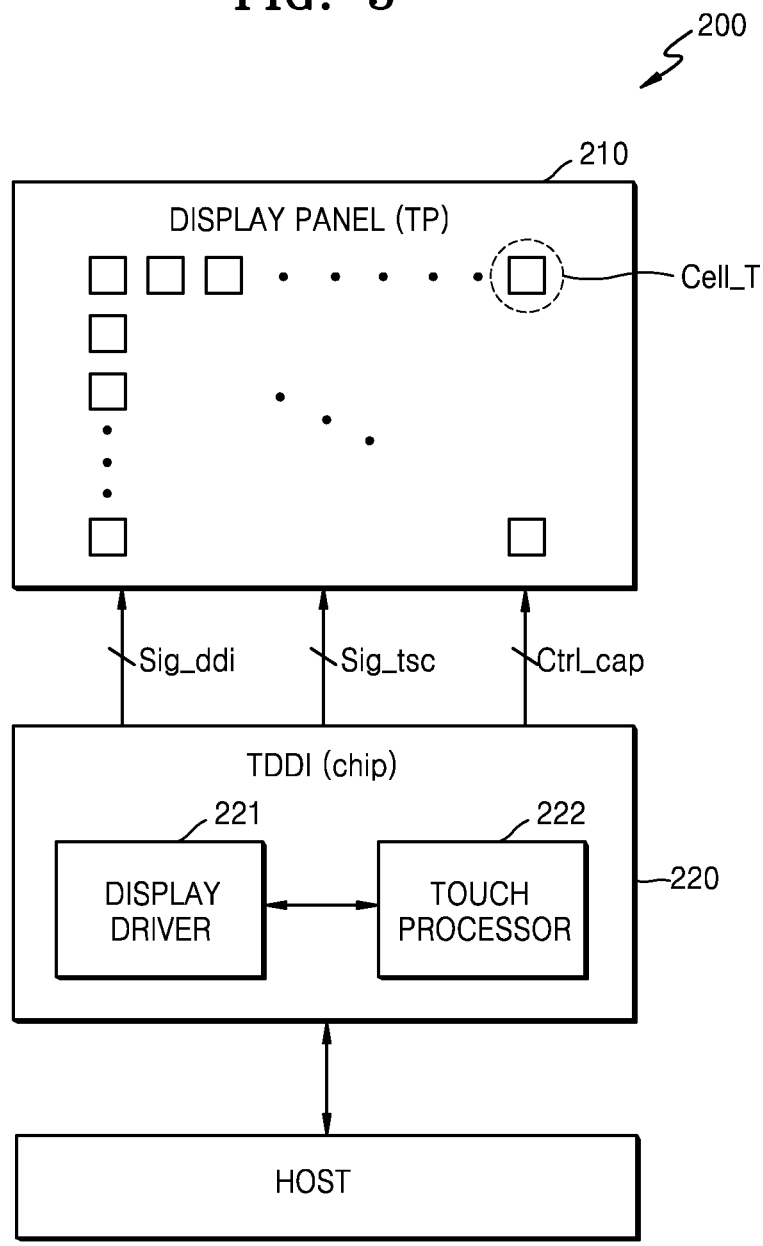
FIG. 5 is a block diagram of an embodiment of a display system.

FIG. 5 is a block diagram of an embodiment of a display system 200. Display system 200 illustrated in FIG. 5 may include a touch processing system. For example, an in-cell type touch panel may be provided in a display panel 210. Also, it is assumed that display panel 210 is driven by a touch DDI (TDDI) chip 220 and a touch processor is integrated into the same semiconductor chip as a display driving circuit. However, embodiments are not limited thereto. As described above, the touch panel may be implemented by various types of touch panels, for example, an on-cell type touch panel. Also, the touch processor and the display driving circuit may be implemented by separate chips.

Referring to FIG. 5, display system 200 may include display panel 210 and touch DDI chip 220 Display panel 210 may include a touch panel TP, and the touch panel TP may include a plurality of sensing cells Cell_T. Also, each of the sensing cells Cell_T may include a sensing unit. For example, the sensing unit may be a common voltage electrode related to display driving.

Touch DDI (TDDI) chip 220 may include a display driver 221 configured to function as the display driving circuit, and a touch processor 222 configured to function as the touch processor. Display driver 221 may generate various signals Sig_ddi related to image representation, and touch processor 222 may generate various signals Sig_tsc related to touch driving. For example, display driver 221 may generate a gate signal for driving a gate line of display panel 210, and a data signal for driving a data line of display panel 210. Touch processor 222 may generate a driving signal to be provided to the touch panel TP and may receive a sensing signal from the touch panel TP.

Also, according to an embodiment, touch DDI chip 220 may generate a capacitance control signal Ctrl_cap capable of adjusting a value of an ambient capacitance component of the sensing cell Cell_T. As described above, the capacitance control signal Ctrl_cap may include various types of signals. For example, the capacitance control signal Ctrl_cap may include a switch control signal for controlling a switch included in the sensing cell Cell_T, and a compensation signal to be provided to at least one electrode adjacent to the sensing unit of the sensing cell Cell_T.

According to an embodiment, some of the capacitance control signals Ctrl_cap may be generated by display driver 221 and may be provided to display panel 210, and others may be generated by touch processor 222 and may be provided to display panel 210. As another example, the capacitance control signals Ctrl_cap may be generated by display driver 221 and may be provided to display panel 210. As another example, the capacitance control signals Ctrl_cap may be generated by touch processor 222 and may be provided to display panel 210. According to an embodiment, the capacitance control signals Ctrl_cap may be generated by touch processor 222 and may be provided to display driver 221, and the capacitance control signals Ctrl_cap may be provided to display panel 210 through display driver 221.

Touch DDI chip 220 may communicate with the host. For example, the host may be implemented by a system on chip (SoC), such as an application processor (AP). Touch DDI chip 220 may produce an image on display panel 210 according to information from the host. Also, touch DDI chip 220 may provide, to the host, touch information indicating a touch or non-touch, and a touch position in the case of a touch, based on a result of driving the touch panel TP.

Figure 6:
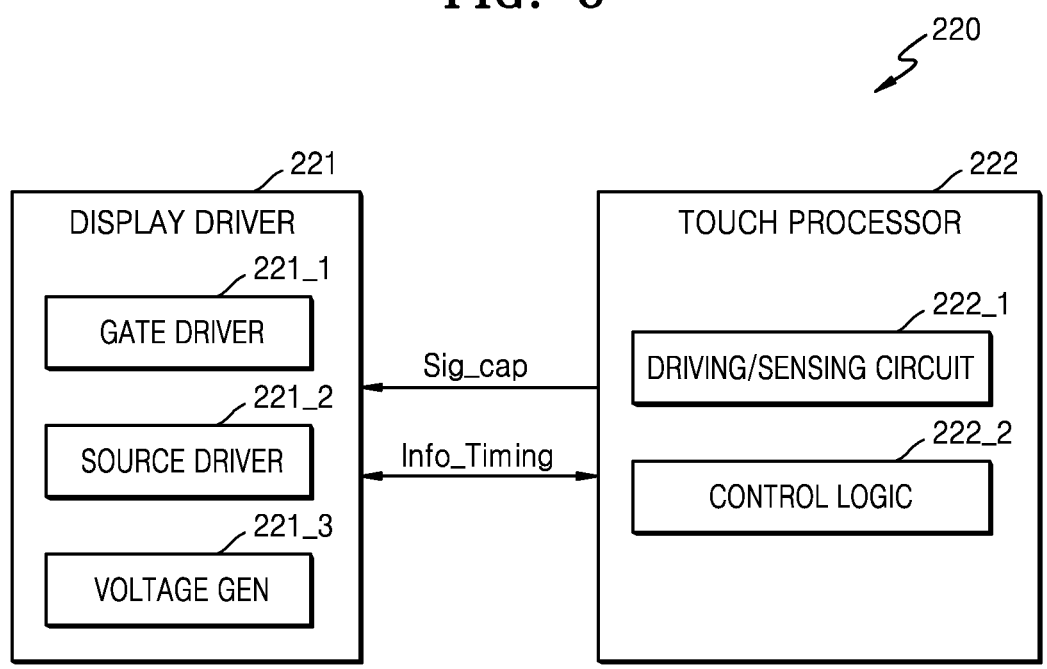
FIG. 6 is a block diagram illustrating an example of a touch display driver integrated circuit (DDI) chip of FIG. 5.

FIG. 6 is a block diagram illustrating an example of touch DDI (TDDI) chip 220 of FIG. 5. TDDI chip 220 may include display driver 221 and touch processor 222.

Referring to FIG. 6, display driver 221 may include a gate driver 221_1, a source driver 221_2, and a voltage generator 221_3. Touch processor 222 may include a driving and sensing circuit 221_1 and a control logic 222_2.

Display driver 221 may drive the display panel and perform various operations so as to produce an image. In addition to the configuration illustrated in FIG. 6, display driver 221 may further include other various elements, such as a timing controller (not illustrated). Also, in addition to the configuration illustrated in FIG. 6, touch processor 222 may further include other various elements. As described above, touch processor 222 may further include a capacitance controller (not illustrated) related to generation of various control signals for adjusting the ambient capacitance component of the sensing cell.

Display driver 221 and touch processor 222 may transmit and receive various signals to and from each other. For example, a variety of timing information Info_Timing related to display driving and/or touch driving/sensing may be transmitted and received between display driver 221 and touch processor 222. Also, touch processor 222 may provide, to display driver 221, a signal Sig_cap related to adjustment of the ambient capacitance component of the sensing cell. Display driver 221 may provide, to display panel 210, at least one selected from among the capacitance control signals described in the above embodiments, based on the signal Sig_cap. For example, display driver 221 may receive the signal Sig_cap as the capacitance control signal and provide the signal Sig_cap to display panel 210, or display driver 221 may generate the capacitance control signal based on the signal Sig_cap and provide the capacitance control signal to display panel 210.

Figure 7:
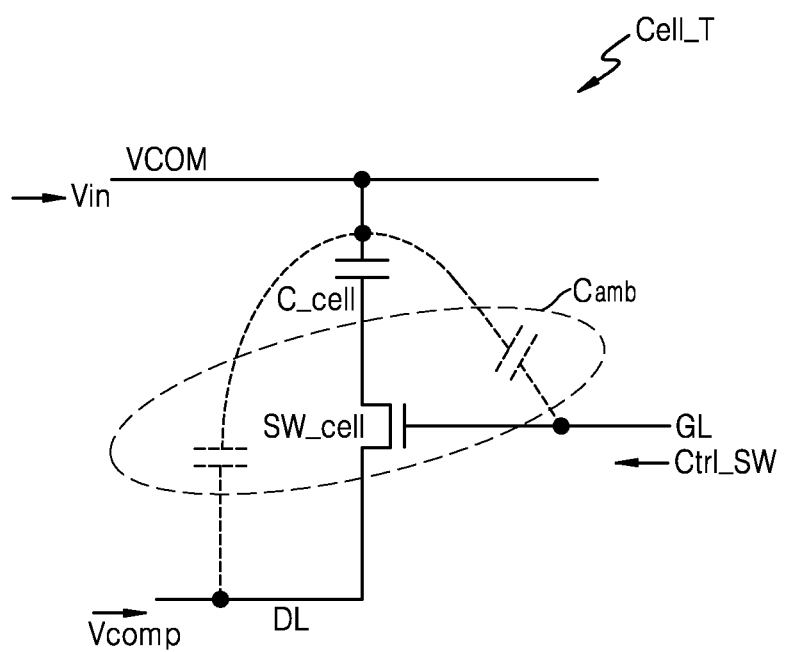
FIG. 7 is a circuit diagram illustrating an example of a sensing cell which may be included in an in-cell type touch panel of FIG. 5.

FIG. 7 is a circuit diagram illustrating an example of the sensing cell Cell_T which may be included in the in-cell type touch panel of FIG. 5.

Referring to FIGS. 5 and 7, the sensing cell Cell_T included in the touch panel may include a common voltage (VCOM) electrode as a sensing unit. The common voltage electrode may include a transparent conductive material, such as ITO, IZO, or ITZO. Also, since a sensing line (or a driving line), which is connected to the common voltage electrode, is separately provided, the driving signal (or the input signal Vin) may be provided to the sensing unit, and the sensing signal may be received from the sensing unit.

Display panel 210 may include a plurality of display cells in regions where gate lines GL and data lines DL intersect with each other. Each of the display cells may include a cell capacitor C_cell and a cell switch SW_cell implemented by a thin film transistor (TFT). In the case of the in-cell type touch panel, since the sensing unit is disposed adjacent to the gate line GL and the data line DL, the sensing unit may be connected to parasitic capacitance components generated by various electrodes.

For example, the ambient capacitance component Camb occurring in the sensing cell Cell_T may include a parasitic capacitance component between the sensing unit and the data line DL, a parasitic capacitance component between the sensing unit and the gate line GL, and the like. In addition, the sensing cell Cell_T may include ambient capacitance components caused by various electrodes adjacent to the sensing unit. Since the common voltage electrode and the adjacent electrodes are disposed close thereto, the ambient capacitance component Camb may have a relative large value.

Similar to the above-described embodiment, the switch control signal Ctrl_SW may be provided to the gate line GL to turn off the cell switch SW_cell connected to the gate line GL, so as to reduce the influence of the ambient capacitance component Camb. In this case, the impedance at the input terminal of the sensing cell Cell_T may increase, and thus, the capacitance at the input terminal of the sensing cell Cell_T may approach zero.

On the other hand, since the cell switch SW_cell does not ideally operate, a compensation signal Vcomp may be provided to at least one electrode adjacent to the sensing unit, so as to compensate for a parasitic component present due to an off state of the cell switch SW_cell. FIG. 7 illustrates an example in which the compensation signal Vcomp is provided to the data line DL. Due to the compensation signal Vcomp, signals having substantially the same waveform as each other are applied to both terminals of the ambient capacitance component Camb. Therefore, it seems as if the ambient capacitance component Camb is shorted during AC driving of the sensing cell Cell_T. Also, it is possible to prevent the sensitivity of the touch driving from being reduced by the ambient capacitance component Camb.

Figure 8A:
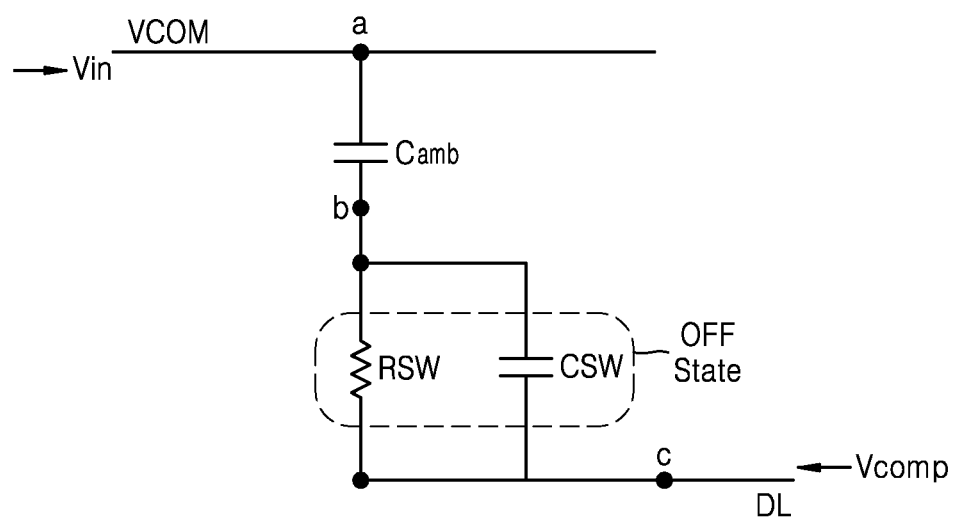
FIGS. 8A, 8B, and 9 are circuit diagrams illustrating an example of applying a compensation signal to various electrodes adjacent to a sensing unit.
Figure 8B:
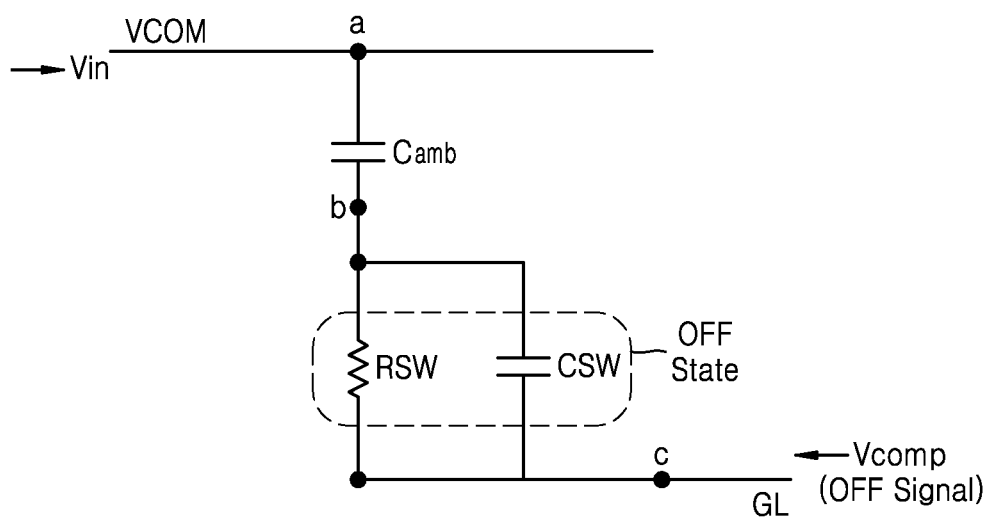
Figure 9:
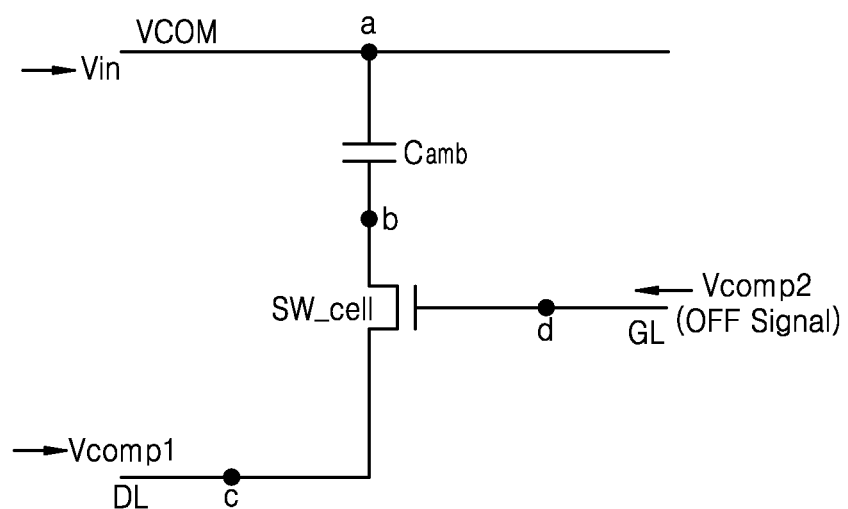

FIGS. 8A, 8B, and 9 are circuit diagrams illustrating an example of applying a compensation signal Vcomp to various electrodes adjacent to a sensing unit.

FIG. 8A illustrates an example of reducing an ambient capacitance component Camb caused by a parasitic capacitance component between a common voltage (VCOM) electrode and a data line DL. Referring to FIGS. 7 and 8A, when the cell switch SW_cell is turned off, parasitic components RSW and CSW are generated, and a compensation signal Vcomp is applied to one terminal c of the data line DL so that signals having substantially the same waveform as each other are applied to both terminals a and b of the ambient capacitance component Camb. The compensation signal Vcomp may be generated taking into account the parasitic components RSW and CSW of the cell switch SW_cell that is in a turned-off state. Accordingly, the compensation signal Vcomp and the input signal Vin may have different waveforms.

FIG. 8B illustrates an example of reducing an ambient capacitance component Camb caused by a parasitic capacitance component between a common voltage (VCOM) electrode and a gate line GL. Referring to FIGS. 7 and 8A, when the cell switch SW_cell is turned off, parasitic components RSW and CSW are generated, and a compensation signal Vcomp is applied to one terminal c of the gate line GL so that signals having substantially the same waveform as each other are applied to both terminals a and b of the ambient capacitance component Camb.

Since the compensation signal Vcomp is provided to the gate line GL, the compensation signal Vcomp is applied to a control electrode of the cell switch SW_cell. Thus, an on or off operation of the cell switch SW_cell may be controlled by the compensation signal Vcomp. The cell switch SW_cell provided in the display cell is switched in response to a relatively high voltage level, and an amplitude of the compensation signal Vcomp provided to the gate line GL according to the present embodiment has characteristics of an off signal that keeps the cell switch SW_cell in a turned-off state. Also, the compensation signal Vcomp may be generated taking into account the parasitic components RSW and CSW of the cell switch SW_cell that is in a turned-off state. Accordingly, the compensation signal Vcomp and the input signal Vin may have different waveforms.

FIG. 9 is a circuit diagram illustrating an example of reducing an ambient capacitance component caused by a data line DL and an ambient capacitance component caused by a gate line GL. For convenience of description, only one ambient capacitance component Camb is illustrated in FIG. 9, but a plurality of ambient capacitance components may be generated by a plurality of electrodes (e.g., data lines and gate lines).

Referring to FIGS. 7 and 9, a first compensation signal Vcomp1 is applied to one terminal c of the data line DL and a second compensation signal Vcomp2 is applied to one terminal d of the gate line GL, so that signals having substantially the same waveform as each other are applied to both terminals a and b of the ambient capacitance component Camb. Also, as described above, an amplitude of the second compensation signal Vcomp2 applied to the gate line GL may have characteristics of an off signal that keeps the cell switch SW_cell in a turned-off state. According to the above-described driving, it is possible to effectively remove the ambient capacitance component between the sensing unit and the data line DL and the ambient capacitance component between the sensing unit and the gate line GL.

Also, according to an embodiment, the first compensation signal Vcomp1 and the second compensation signal Vcomp2 may have different waveforms than the input signal Vin. Also, the parasitic component looking from the data line DL may be different from the parasitic component looking from the gate line GL. Accordingly, the first compensation signal Vcomp1 and the second compensation signal Vcomp2 may have different waveforms.

Hereinafter, various examples of generating a compensation signal will be described. For convenience of description, it is assumed that a data line DL is an electrode that forms a parasitic capacitance with a sensing unit.

Figure 10:
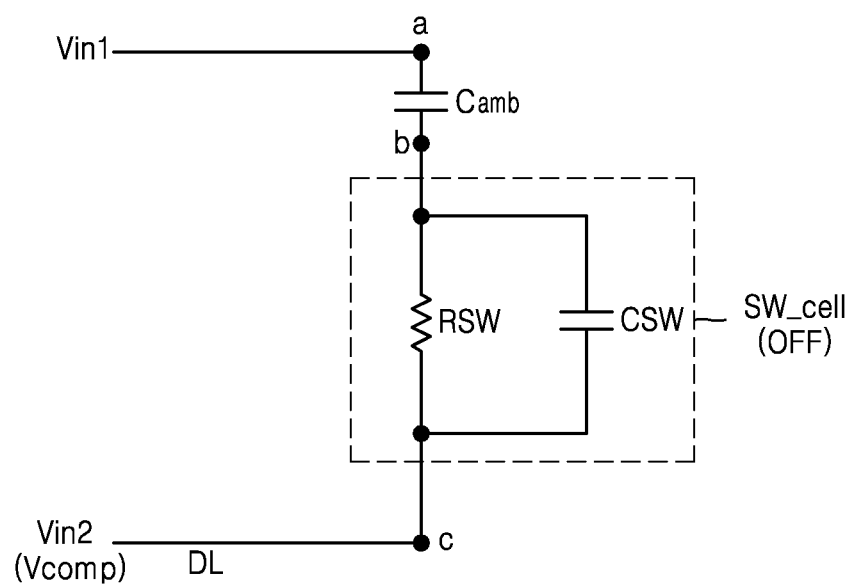
FIG. 10 is a circuit diagram illustrating a first example of generating a compensation signal.

FIG. 10 is a circuit diagram illustrating a first example of generating a compensation signal Vcomp.

Referring to FIG. 10, an input signal Vin1 is applied to a sensing unit included in a sensing cell. An ambient capacitance component Camb is formed between the sensing unit and the data line DL, and parasitic components RSW and CSW are formed due to a turned-off state of a cell switch SW_cell. A compensation signal Vcomp is applied to one terminal c of the data line DL.

As a capacitance control signal, a switch control signal (or a separate compensation signal provided to a gate line) is applied to a control electrode of the cell switch SW_cell, and thus, the cell switch SW_cell is turned off. Also, amplitude, phase, and frequency characteristics of the compensation signal Vcomp may be determined taking into account the parasitic components RSW and CSW. Due to the application of the compensation signal Vcomp, signals having substantially the same waveform as each other may be applied to both terminals a and b of the ambient capacitance component Camb.

The compensation signal Vcomp is a signal Vin2 having a different waveform than the input signal Vin1. According to an embodiment, the compensation signal Vcomp may be generated separately from the input signal Vint. For example, the touch DDI chip in the above-described embodiment may separately include a signal generator configured to generate the input signal Vin1 and a signal generator configured to generate the compensation signal Vcomp. According to an embodiment, the input signal Vin1 may be generated by the touch processor of the touch DDI chip and may be provided to the input terminal of the sensing cell. On the other hand, since the compensation signal Vcomp is provided to the data line DL, the compensation signal Vcomp may be generated by the display driver of the touch DDI chip, regardless of the input signal Vint, and may be provided to the data line DL through the source driver.

Figure 11A:
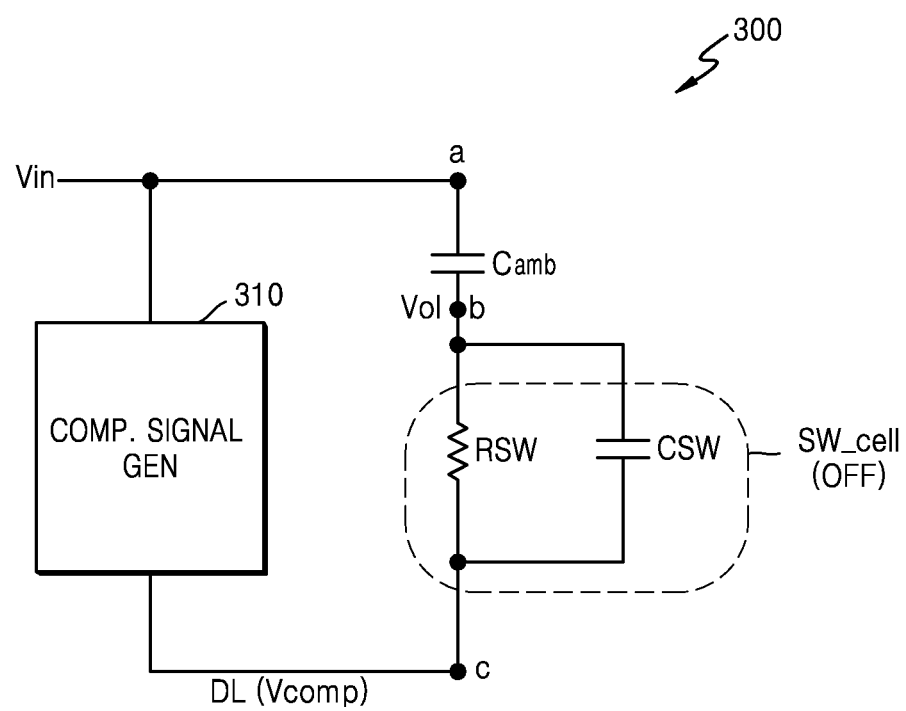
FIGS. 11A and 11B are circuit diagrams illustrating another example of generating a compensation signal.
Figure 11B:
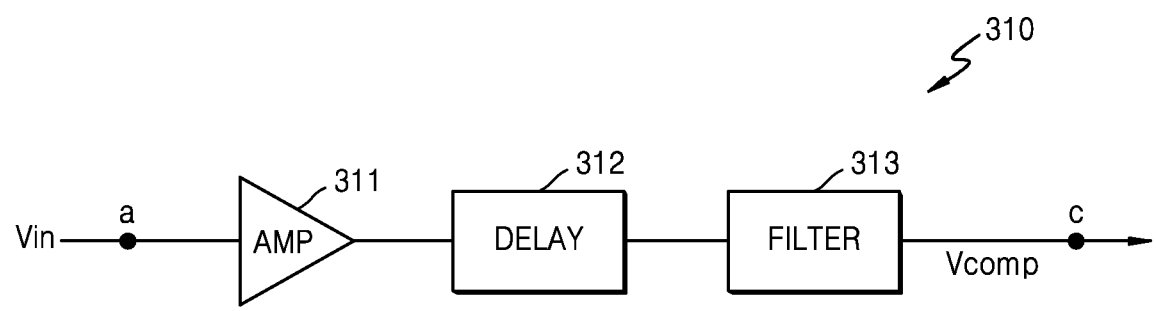

FIGS. 11A and 11B are circuit diagrams illustrating another example of generating a compensation signal Vcomp. FIGS. 11A and 11B illustrate an example of generating the compensation signal Vcomp through a processing operation using an input signal Vin.

Referring to FIG. 11A, a display system (or a touch processing system) 300 may include a display panel including a touch panel, and a touch DDI chip including a touch processor. One sensing cell included in the touch panel and a compensation signal generator 310 are illustrated in FIG. 11A. Compensation signal generator 310 generates a compensation signal Vcomp that is provided to the sensing cell. Other sensing cells included in the touch panel may be driven in an identical or similar manner to the sensing cell illustrated in FIG. 11A. Also, compensation signal generator 310 may be provided inside the touch DDI chip in various forms. For example, compensation signal generator 310 may be provided inside the touch processor. Alternatively, compensation signal generator 310 may be provided inside a display driver.

The cell switch SW_cell is turned off so as to reduce a value of an ambient capacitance component Camb, and parasitic components RSW and CSW are generated according to the turned-off state of the cell switch SW_cell. Compensation signal generator 310 may receive the input signal Vin provided to the sensing unit of the sensing cell, and generate the compensation signal Vcomp having a different waveform than the input signal Vin by performing a processing operation on the received input signal Vin. The generated compensation signal Vcomp may be provided to a data line DL.

Due to the compensation signal Vcomp, signals having substantially the same waveform as each other may be applied to both terminals a and b of the ambient capacitance component Camb. That is, compensation signal generator 310 may actively control the input signal Vin so that voltages of both terminals of the ambient capacitance component Camb have substantially the same waveform as each other. Accordingly, it is possible to effectively remove the influence of the ambient capacitance component Camb during touch driving.

FIG. 11B is a block diagram of compensation signal generator 310 of FIG. 11A, according to an embodiment.

Referring to FIGS. 11A and 11B, compensation signal generator 310 may include various circuits configured to adjust the waveform of the input signal Vin. For example, compensation signal generator 310 may include an amplifier 311, a delay 312, and a filter 313. However, this is merely an example. Compensation signal generator 310 may further include various circuits configured to adjust the input signal Vin so that voltages of both terminals of an ambient capacitance component Camb have substantially the same waveform as each other.

When the compensation signal Vcomp is applied to one terminal c connected to the data line, the parasitic component generated due to the turned-off state of the cell switch SW_cell may change the waveform of the compensation signal Vcomp actually applied to one terminal b of the ambient capacitance component Camb. For example, an amplitude of the waveform of the voltage of one terminal b of the ambient capacitance component Camb may be smaller than an amplitude of the compensation signal Vcomp. Also, a phase of the voltage of one terminal b of the ambient capacitance component Camb may lead or lag behind a phase of the compensation signal Vcomp.

Compensation signal generator 310 receives the input signal Vin, which is provided to the sensing unit, and processes the received input signal Vin, taking into consideration the above-described characteristics. For example, amplifier 311 may amplify a level of the input signal Vin taking into account the parasitic component of the cell switch SW_cell, and delay 312 may output a signal having a different phase than the input signal Vin by adjusting a delay with respect to an output signal of amplifier 311. Filter 313 may remove an influence (e.g., noise) occurring in the output signal of delay 312 by performing a filtering operation on the output signal of delay 312.

Figure 12:
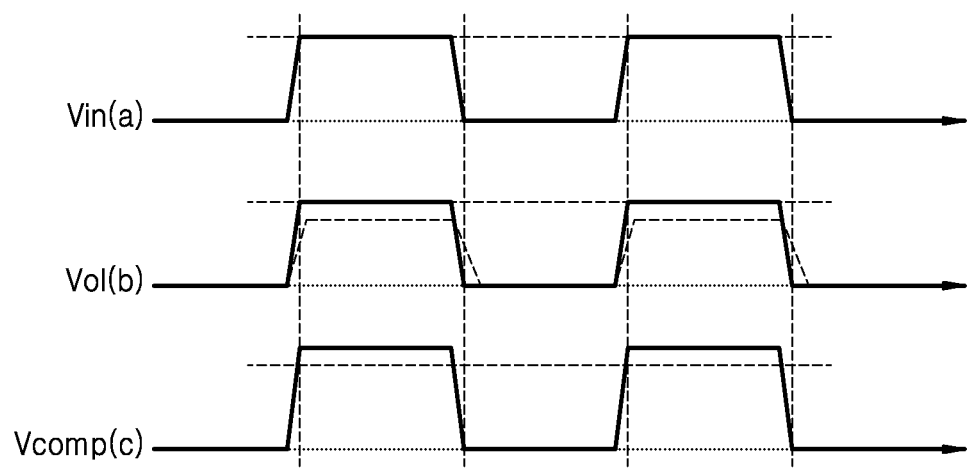
FIG. 12 is a waveform diagram illustrating waveforms of various voltage signals according to a compensation signal generated by a compensation signal generator of FIGS. 11A and 11B.

FIG. 12 is a waveform diagram illustrating waveforms of various voltage signals according to the compensation signal Vcomp generated by the compensation signal generator 310 of FIGS. 11A and 11B.

Referring to FIGS. 11A, 11B, and 12, the compensation signal Vcomp, which is generated by the compensation signal generator 310 and is applied to the third terminal c, has a different waveform than the input signal Vin. The compensation signal Vcomp may be provided to the second terminal b after the waveform thereof is changed by the parasitic component of the cell switch SW_cell, and a signal Vol(b) provided to the second terminal b may have substantially the same waveform as the input signal Vin. That is, when the compensation signal Vcomp according to the present embodiment is not applied, a signal Vol(b) provided to the second terminal b may have a smaller amplitude than the input signal Vin, or a phase of the signal Vol(b) may lag behind a phase of the input signal Vin, as indicated by a dashed line. However, when the compensation signal Vcomp generated according to the present embodiment is applied to the third terminal c, the signal Vol(b) provided to the second terminal b may have substantially the same amplitude as the input signal Vin and may have substantially the same phase as the input signal Vin.

Figure 13:
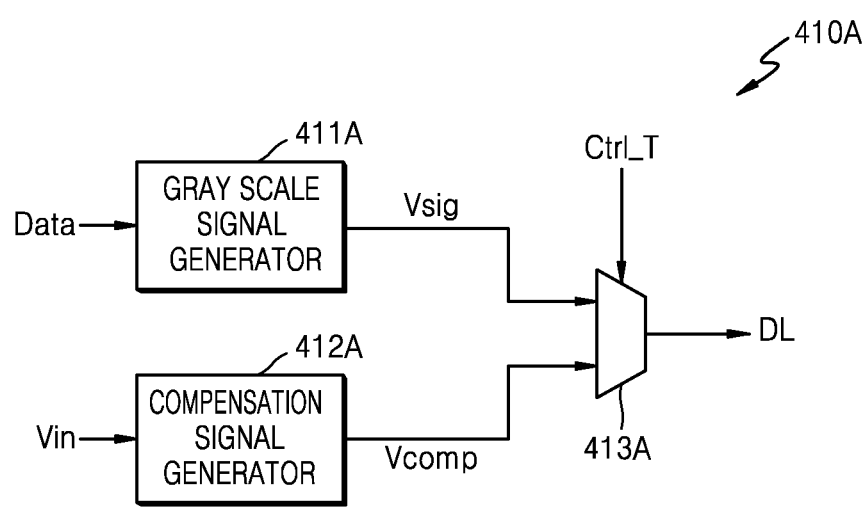
FIGS. 13 to 15 are block diagrams illustrating various examples of transferring a compensation signal.
Figure 14:
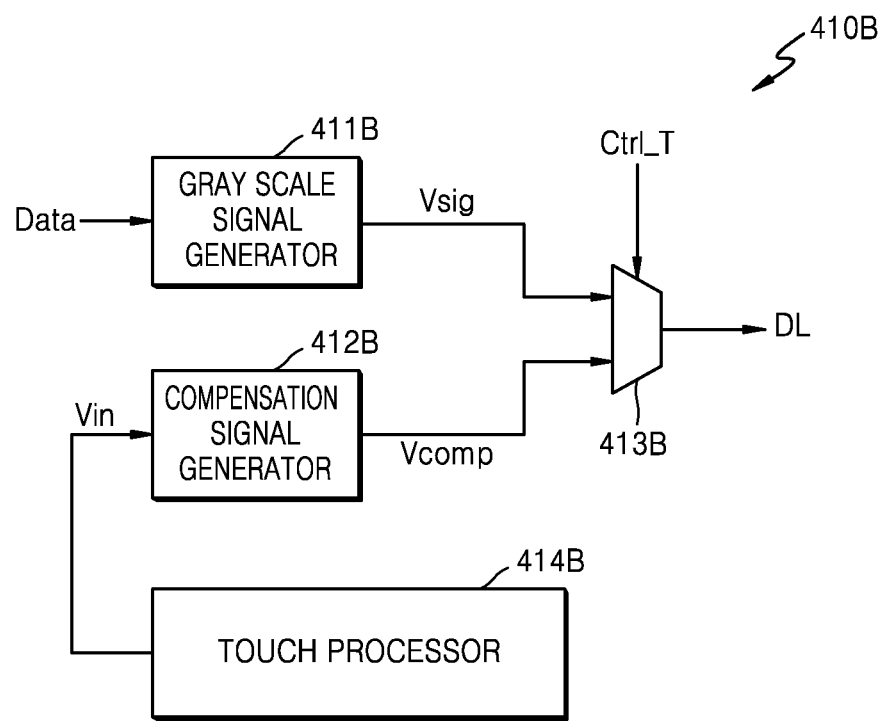
Figure 15:
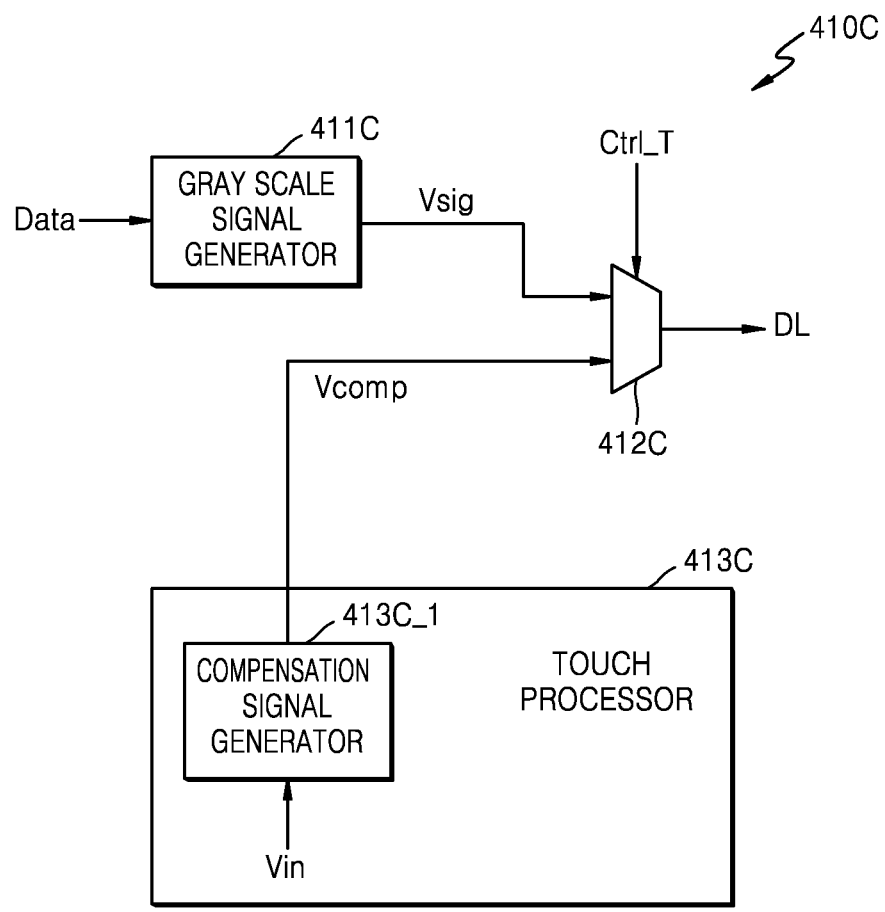

FIGS. 13 to 15 are block diagrams illustrating various examples of transferring a compensation signal Vcomp. FIGS. 13 to 15 illustrate embodiments of touch DDI chips 410A, 410B, and 410C configured to drive a display panel including a touch panel.

Referring to FIG. 13, touch DDI chip 410A may include a gray scale signal generator 411A, a compensation signal generator 412A, and a selector 413A. Similar to the above-described embodiment, touch DDI chip 410A may include a display driver and a touch processor. According to an embodiment, gray scale signal generator 411A, compensation signal generator 412A, and selector 413A may be included in the display driver.

Touch DDI chip 410A may provide, to a data line DL, a gray scale voltage Vsig corresponding to gray scale data Data during a display period, and may provide, to the display panel, various voltage signals related to display driving. For example, during the display period, a common voltage (VCOM) having a constant voltage level may be provided to a common electrode. Selector 413A outputs the gray scale voltage Vsig to the data line DL during the display period in response to a period control signal Ctrl_T.

As described above, in the display driver, compensation signal generator 412A may process the input signal Vin to generate the compensation signal Vcomp. According to an embodiment, a voltage generator (not illustrated) included in the display driver may generate the input signal Vin having substantially the same waveform as a driving signal provided to the touch panel and may provide the generated input signal Vin to compensation signal generator 412A. Compensation signal generator 412A may generate the compensation signal Vcomp having a different waveform than the input signal Vin and may provide the generated compensation signal Vcomp to selector 413A. During a touch sensing period, selector 413A may provide the compensation signal Vcomp to the data line DL in response to the period control signal Ctrl_T.

Referring to FIG. 14, touch DDI chip 410B may include a gray scale signal generator 411B, a compensation signal generator 412B, a selector 413B, and a touch processor 414B. Similar to the above-described embodiment, touch DDI chip 410B may include a display driver and touch processor 414B. According to an embodiment, gray scale signal generator 411B, compensation signal generator 412B, and selector 413B may be included in the display driver.

In the touch sensing period, touch processor 414B may provide an input signal (or a driving signal) Vin to the touch panel and may provide the input signal Vin to the display driver. Compensation signal generator 412B may generate the compensation signal Vcomp by using the input signal Vin provided by touch processor 414B. Selector 413B may receive the gray scale voltage Vsig and the compensation signal Vcomp that are respectively generated by gray scale generator 411B and compensation signal generator 412B, and may selectively output the gray scale voltage Vsig and the compensation signal Vcomp in response to the period control signal Ctrl_T.

Referring to FIG. 15, touch DDI chip 410C may include a gray scale signal generator 411C, a selector 412C, and a touch processor 413C. Touch processor 413C may include a compensation signal generator 413C_1. Similar to the above-described embodiment, touch DDI chip 410C may include a display driver and touch processor 413C. According to an embodiment, gray scale signal generator 411C and selector 412C may be included in the display driver.

In a touch sensing period, touch processor 413C may provide an input signal Vin to the touch panel, and compensation signal generator 413C_1 of touch processor 413C may process the input signal Vin to generate a compensation signal Vcomp. Also, the compensation signal Vcomp may be provided to selector 412C included in the display driver. Selector 412C may receive a gray scale voltage Vsig and the compensation signal Vcomp and selectively output the gray scale voltage Vsig and the compensation signal Vcomp in response to a period control signal Ctrl_T.

As described above, the compensation signal Vcomp may be generated by the touch DDI chip by using various methods and may be provided to a data line DL through the display driver. According to an embodiment, in a case where a source driver of the display driver drives the data line DL, selector 412C may be included in the source driver.

Various examples of generating and transferring the compensation signal Vcomp that is provided to the data line DL have been described in the above embodiments, but other embodiments may also be variously applied. For example, in a case where the compensation signal is provided to a gate line, the compensation signal may be variously generated by the display driver or the touch processor and may be provided to the gate line through a gate driver of the display driver. That is, a gate signal for turning on the cell switch may be selectively provided in the display driving period, and the compensation signal for turning off the cell switch and reducing the ambient capacitance component between the sensing unit and the gate line may be selectively provided in the touch sensing period.

Figure 16:
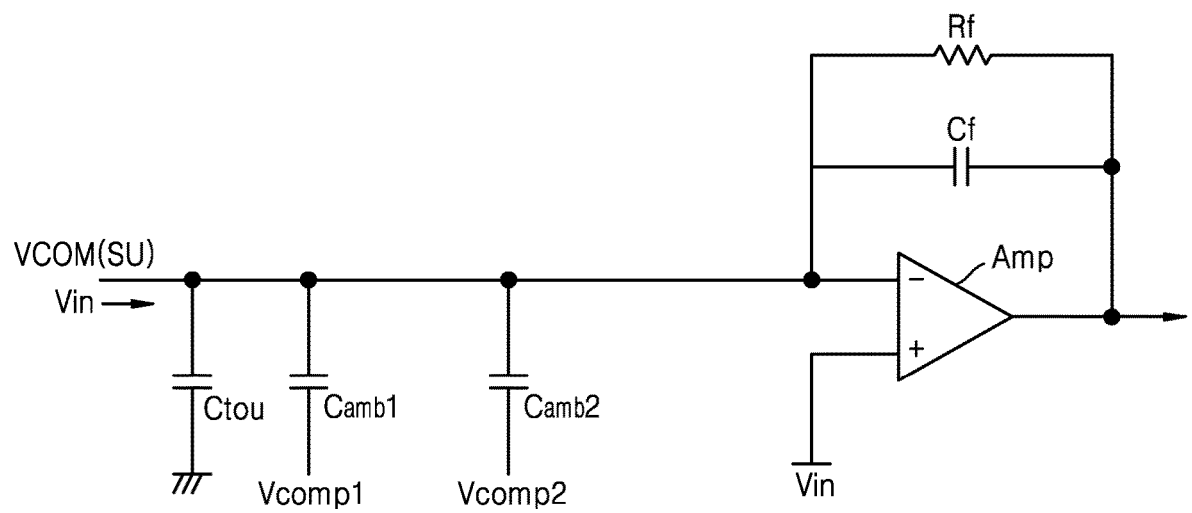
FIG. 16 is a circuit diagram illustrating an example embodiment of a sensing circuit included in a touch processor.

FIG. 16 is a circuit diagram of an embodiment of a sensing circuit included in a touch processor. FIG. 16 illustrates a circuit configuration connected to one sensing unit SU from among elements of the sensing circuit.

Referring to FIG. 16, the sensing circuit may include an amplifier Amp connected to the sensing unit SU (e.g., a common voltage (VCOM) electrode). A sensing signal output by the sensing unit SU may be applied to a first input terminal (e.g., an inverting input terminal (−)) of the amplifier Amp, and various types of signals, such as a ground voltage or an AC signal, may be applied to a second input terminal (e.g., a non-inverting input terminal (+)) of the amplifier Amp FIG. 16 illustrates an example of providing an input signal Vin to the second input terminal of the amplifier Amp. A resistor Rf and a capacitor Cf may be connected between the first input terminal and an output terminal of the amplifier Amp Due to such a configuration, the amplifier Amp may operate as a certain filter (e.g., a high-pass filter).

As capacitance components connectable to the sensing unit SU, there may exist a touch capacitance Ctou caused by a touch input, ambient capacitance components Camb1 and Camb2 caused by a data line and a gate line, or the like. A value of the touch capacitance Ctou may change according to the touch input. Also, according to an embodiment, compensation signals Vcomp1 and Vcomp2 may be provided to various electrodes (e.g., the data line and the gate line) causing the ambient capacitance components Camb1 and Camb2, and the influence of the ambient capacitance components Camb1 and Camb2 may be effectively reduced during a sensing operation using the amplifier Amp.

Figure 17:
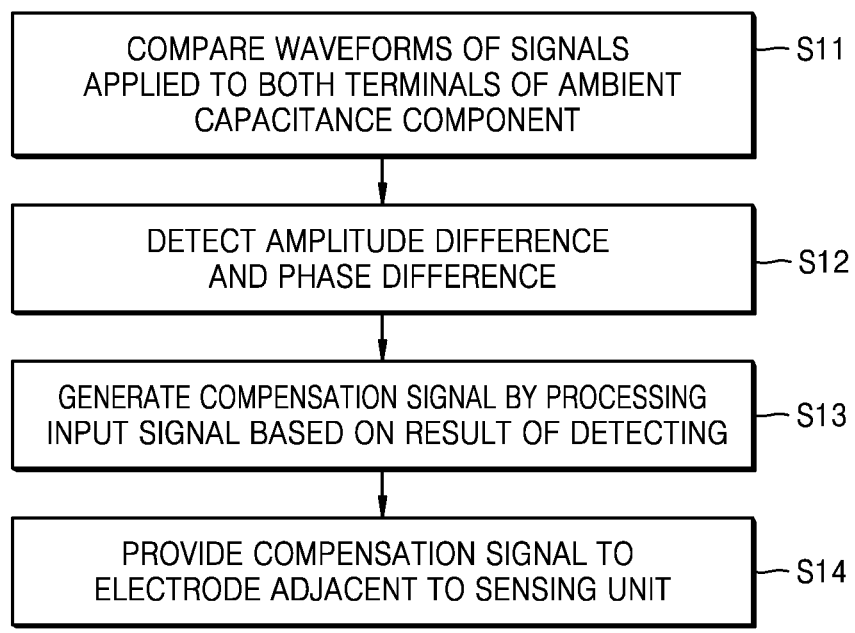
FIG. 17 is a flowchart of an embodiment of a method of driving a display system.
Figure 18:
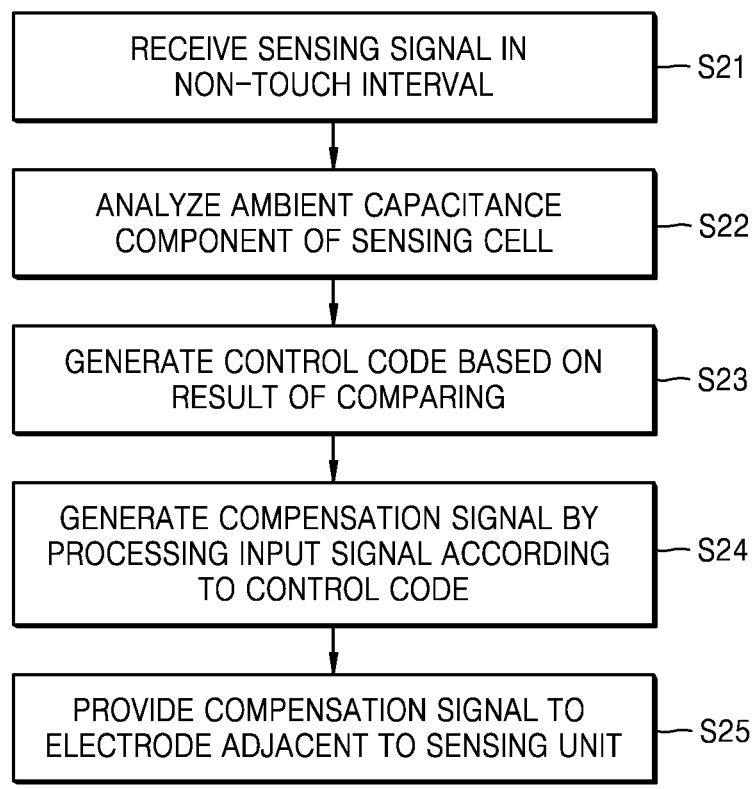
FIG. 18 is a flowchart of a method of adjusting a waveform of a compensation signal, according to an embodiment.
Figure 19:
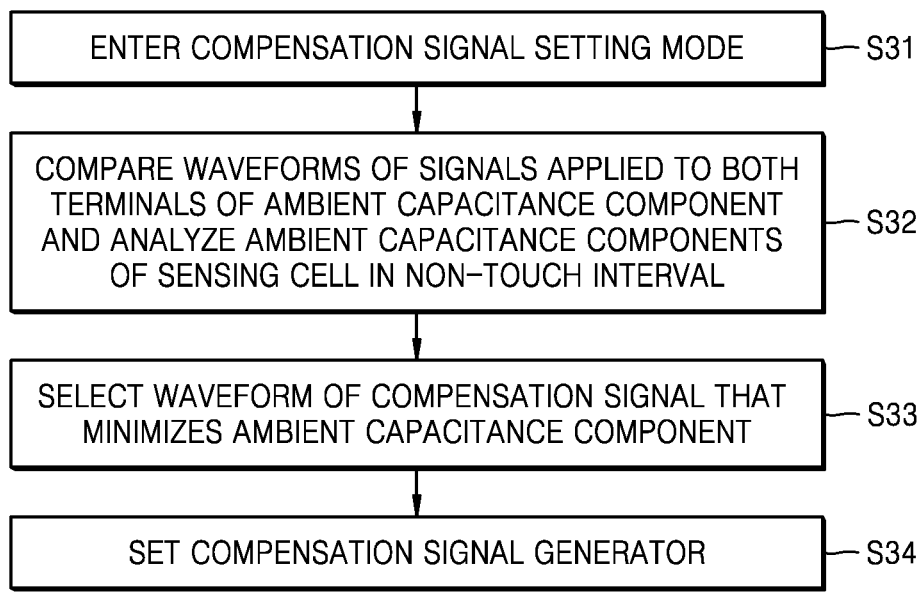
FIG. 19 is a flowchart of a method of presetting operation characteristics of a compensation signal generator in a specific mode, according to an embodiment.

FIGS. 17 to 19 are flowcharts of embodiments of methods of driving a display device.

Referring to FIG. 17, in operation S11, signals applied to both terminals of an ambient capacitance component may be provided to a certain signal processor, and waveforms of the signals applied to both terminals of the ambient capacitance component may be compared with each other, so as to minimize a value of the ambient capacitance component. In operation S12, an amplitude difference and a phase difference between the signals applied to both terminals of the ambient capacitance component may be detected based on a result of the comparing. Examples of a component causing a difference in waveforms of the signals applied to both terminals of the ambient capacitance component may include a parasitic component generated due to a turned-off state of a switch included in a sensing cell.

When the waveforms of the signals applied to both terminals of the ambient capacitance component are different from each other, a compensation signal having a different waveform may be generated based on a result of the detecting. For example, in operation S13, the compensation signal having a different waveform may be generated by processing an input signal based on the result of the detecting. In operation S14, the generated compensation signal may be provided to an electrode adjacent to the sensing unit (e.g., an electrode causing the ambient capacitance component). The above process may be repeated to adjust the waveform of the compensation signal until the signals applied to both terminals of the ambient capacitance component have substantially the same waveform as each other. Accordingly, it is possible to generate the compensation signal having a waveform for effectively removing the ambient capacitance component.

FIG. 18 is a flowchart of another embodiment of a method of adjusting a waveform of a compensation signal. Referring to FIG. 18, in operation S21, in a non-touch period in which no touch input is provided, a driving signal (or an input signal) may be provided to a sensing unit and a sensing signal may be received from the sensing unit. In operation S22, by analyzing the sensing signal received in the non-touch period, an ambient capacitance component of a sensing cell including the corresponding sensing unit may be analyzed.

In operation S23, a control code for controlling operating characteristics of a compensation signal generator in a digital manner may be generated based on a result of the analyzing. In operation S24, the compensation signal generator may generate a compensation signal having a changed waveform by processing the input signal according to the control code. In operation S25, the generated compensation signal may be provided to an electrode adjacent to the sensing unit (e.g., an electrode causing the ambient capacitance component). The above process may be repeated to adjust the waveform of the compensation signal until the value of the ambient capacitance component is minimized. Accordingly, it is possible to generate the compensation signal having a waveform for effectively removing the ambient capacitance component.

FIG. 19 is a flowchart of an embodiment of a method of presetting operating characteristics of a compensation signal generator in a specific mode. Referring to FIG. 19, in operation S31, a touch DDI chip may enter a compensation signal setting mode during an initial operation of the touch DDI chip or a normal operation of the touch DDI chip.

In the compensation signal setting mode, a touch driving operation may be performed so as to minimize a value of an ambient capacitance component. For example, similar to the above-described embodiment, in operation S32, waveforms of signals applied to both terminals of the ambient capacitance component may be compared with each other, or the ambient capacitance component of the sensing cell may be analyzed in the non-touch period. In operation S33, a waveform of a compensation signal, which minimizes the ambient capacitance component, may be selected according to the above operation. In operation S34, the compensation signal generator may be set to generate the compensation signal having the selected waveform. Subsequently, the compensation signal generator may generate the compensation signal which minimizes the value of the ambient capacitance component, by processing the input signal according to set characteristics, and may provide the generated compensation signal to at least one electrode of a touch panel (or a display panel).

FIGS. 20 to 27 are diagrams illustrating various examples of adjusting a waveform of a compensation signal. FIGS. 20 to 27 illustrate one sensing cell of a touch panel and various circuits for driving the sensing cell. The various circuits may be included a display driver and/or a touch processor of a touch DDI chip.

Figure 20:
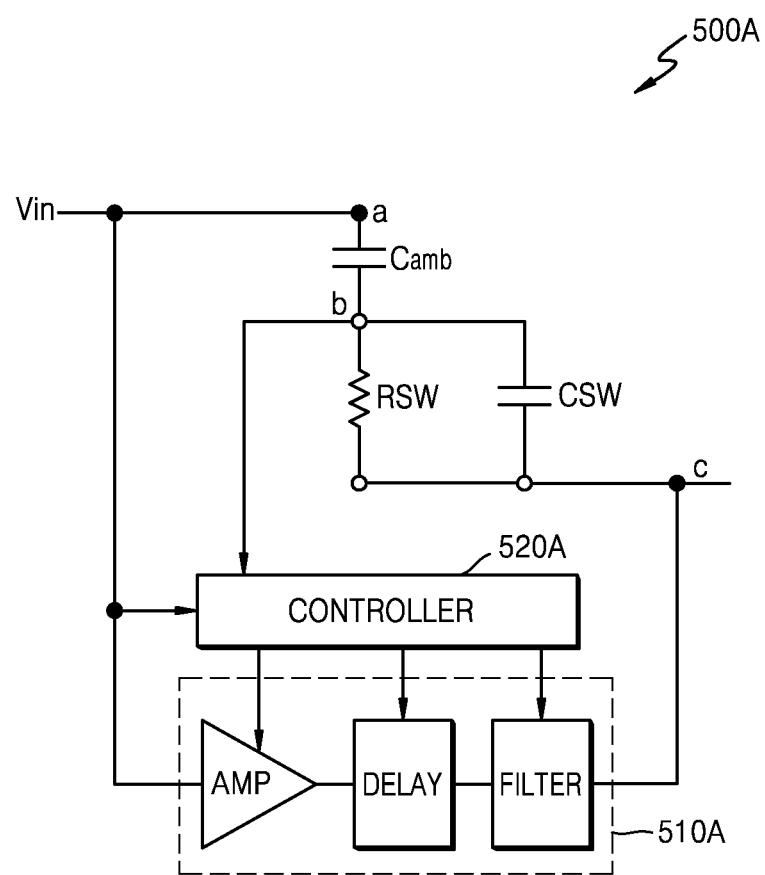
FIGS. 20, 21, 22, 23, 24, 25, 26 and 27 are diagrams illustrating various examples of adjusting a waveform of a compensation signal.

Referring to FIG. 20, a display system (or a touch processing system) 500A may include a plurality of sensing cells. Each of the plurality of sensing cells may include an ambient capacitance component Camb between a sensing unit and an electrode adjacent to the sensing unit. Both terminals of the ambient capacitance component Camb may correspond to a first terminal a and a second terminal b, respectively, and parasitic components RSW and CSW of a cell switch may be disposed between the second terminal b and a third terminal c.

The touch DDI chip of display system 500A may include a compensation signal generator 510A configured to generate a compensation signal Vcomp, and a controller 520A configured to set input signal adjustment characteristics of compensation signal generator 510A. Controller 520A may receive signals from both terminals a and b of the ambient capacitance component Camb and compare waveforms of the signals applied to both terminals a and b of the ambient capacitance component Camb. Controller 520A may control compensation signal generator 510A based on a result of the comparing, and compensation signal generator 510A may generate the compensation signal Vcomp having a different waveform than the input signal Vin by performing an amplification operation, a delay operation, and a filtering operation on the input signal Vin under control of controller 520A, and provide the generated compensation signal Vcomp to the third terminal c.

As described above, the third terminal c, to which the compensation signal Vcomp is applied, may be nodes on various electrodes that are connected to the sensing unit of the sensing cell to form the ambient capacitance component Camb. For example, the compensation signal Vcomp may be applied to a gate electrode and/or a data electrode adjacent to the sensing unit.

Figure 21:
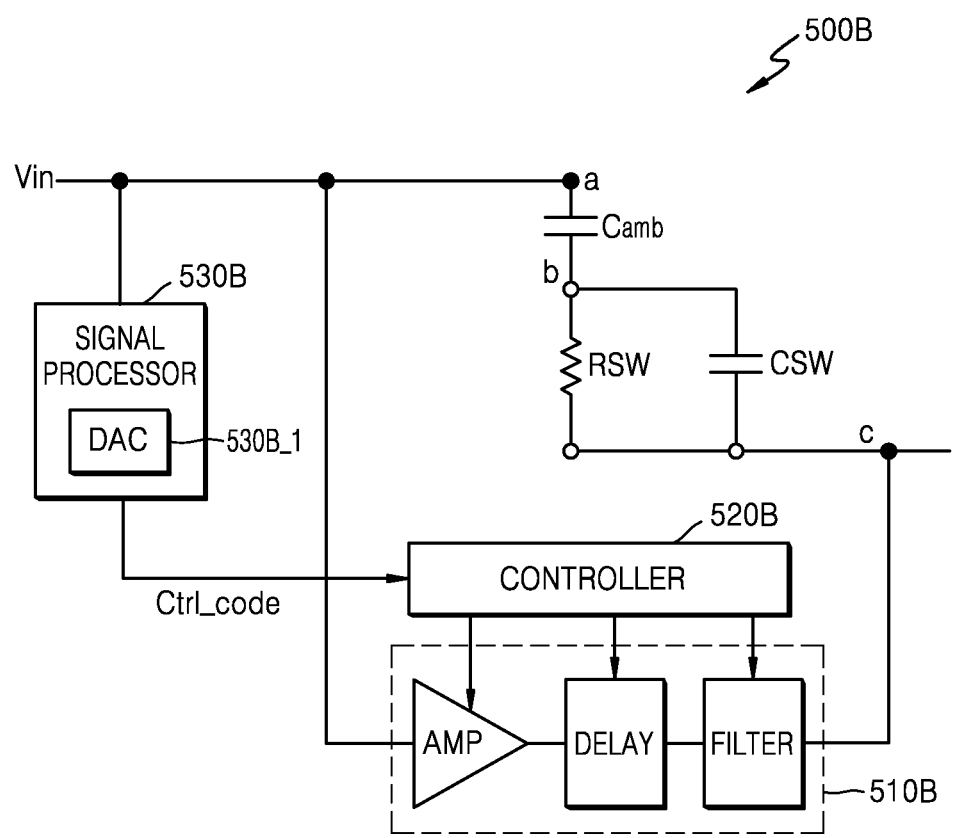

Referring to FIG. 21, a display system (or a touch processing system) 500B may include a plurality of sensing cells. In each of the sensing cells, an ambient capacitance component Camb may be disposed between a first terminal a and a second terminal b, and parasitic components RSW and CSW of the cell switch may be disposed between the second terminal b and a third terminal c. Also, in relation to generation of a compensation signal Vcomp, a touch DDI chip may include a compensation signal generator 510B, a controller 520B, and a signal processor 530B. Signal processor 530B may include a digital-to-analog converter (DAC) 530B_1.

Signal processor 530B may receive a sensing signal through a sensing unit and analyze an ambient capacitance component of the sensing cell. For example, if the sensing signal is analyzed in a non-touch period where no touch input is provided to the sensing unit, a value of the ambient capacitance component Camb formed in the sensing cell may be determined, and compensation signal generator 510B may be controlled to generate a compensation signal Vcomp for minimizing the value of the ambient capacitance component Camb.

For example, signal processor 530B may generate a control code Ctrl_code for controlling control signal 520B in a digital manner according to the value of the ambient capacitance component Camb, and may provide the generated control code Ctrl_code to controller 520B. Controller 520B may control an amplifier, a delay, and a filter, which are included in compensation signal generator 510B, in response to the control code Ctrl_code. The control code Ctrl_code, which is capable of minimizing the value of the ambient capacitance component Camb, may be set by repeating the above operations. A waveform of the compensation signal Vcomp may be set based on the control code Ctrl_code.

Figure 22:
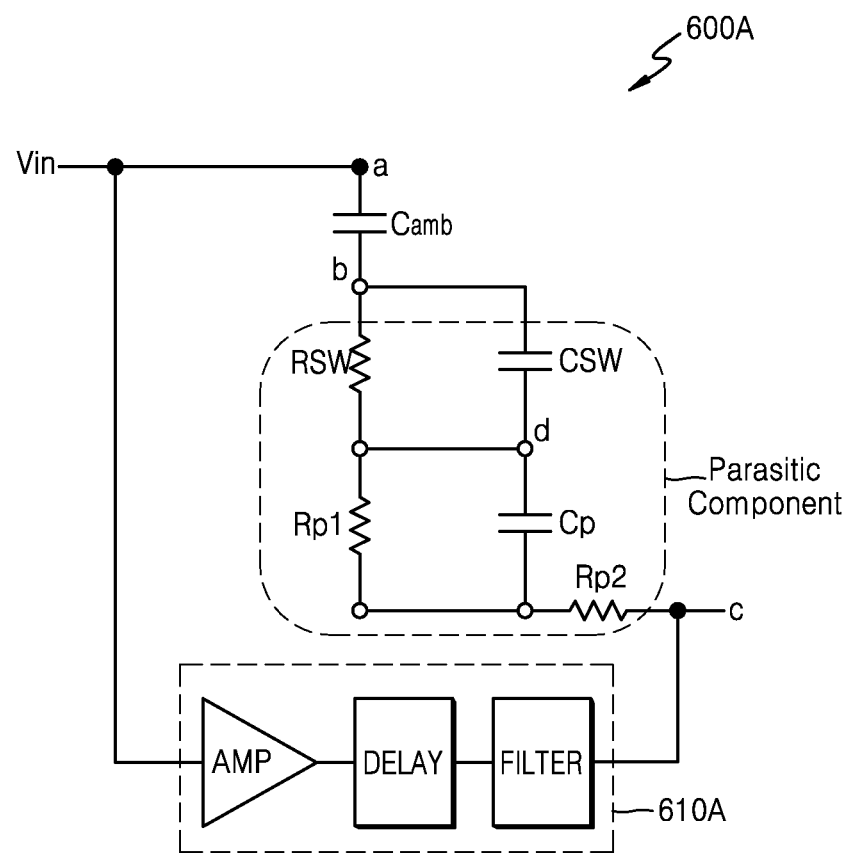
Figure 23:
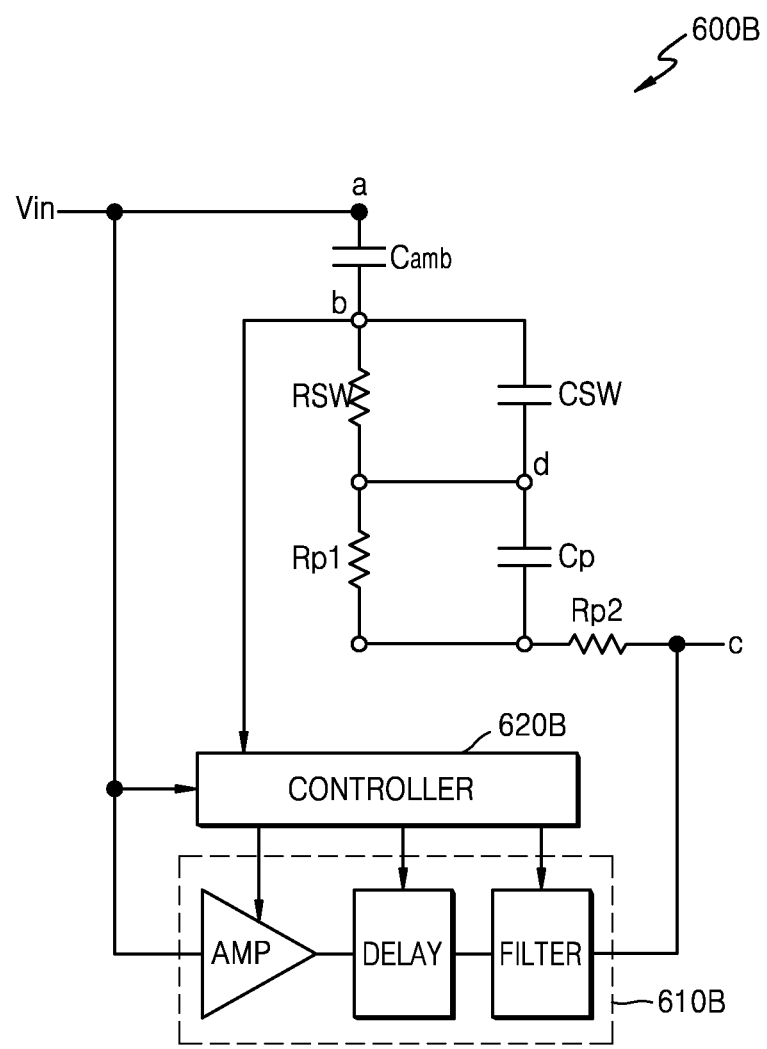
Figure 24:
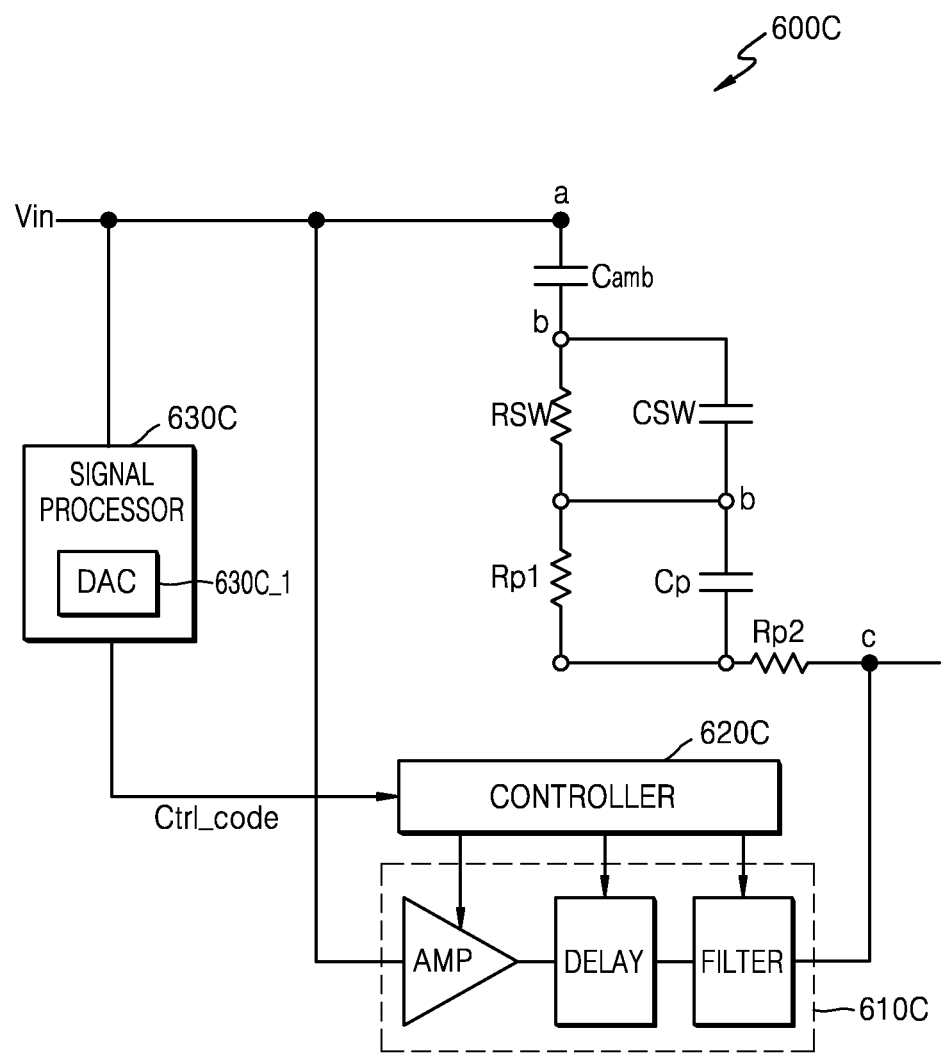

FIGS. 22 to 24 illustrate other examples of adjusting a waveform of a compensation signal. FIGS. 22 to 24 illustrate examples of generating a compensation signal by compensating for components (e.g., parasitic resistance components, parasitic capacitance components, and parasitic inductance components) generated by factors other than the parasitic component of the cell switch.

Referring to FIG. 22, a display system (or a touch processing system) 600A may include a plurality of sensing cells. In each of the sensing cells, an ambient capacitance component Camb may be disposed between a first terminal a and a second terminal b, and parasitic components RSW and CSW of the cell switch may be disposed between the second terminal b and a fourth terminal d. Parasitic components Rp1, Cp, and Rp2 caused by various elements may be disposed between a third terminal c and the fourth terminal d. For example, the parasitic components Rp1, Cp, and Rp2 between the third terminal c and the fourth terminal d may be parasitic components that are connected to the sensing unit by various electrodes adjacent to the sensing unit other than a gate line or a data line. Alternatively, the parasitic components Rp1, Cp, and Rp2 may be RLC components generated in the gate line itself or RLC components generated in the data line itself.

In relation to generation of a compensation signal Vcomp, a touch DDI chip may include a compensation signal generator 610A. Compensation signal generator 610A may receive an input signal Vin and generate the compensation signal Vcomp by processing the received input signal Vin. For example, when the third terminal c, to which the compensation signal Vcomp is applied, corresponds to the data line, an amplitude and a phase of the compensation signal Vcomp may be adjusted taking into account the parasitic components RSW and CSW generated by the cell switch and the parasitic components Rp1, Rp2, and Cp generated in the data line itself. Accordingly, signals having substantially the same waveform as each other may be applied to both terminals a and b of the ambient capacitance component Camb, and the ambient capacitance component Camb caused by the data line may be effectively removed.

Referring to FIG. 23, unlike in the embodiment illustrated in FIG. 22, a touch DDI chip included in a display system 600B may include a compensation signal generator 610B and a controller 620B. Similar to the above-described embodiment, controller 620B may receive signals from both terminals a and b of an ambient capacitance component Camb, compare waveforms of the signals applied to both terminals a and b of the ambient capacitance component Camb, and control compensation signal generator 610B based on a result of the comparing. Under control of controller 620B, compensation signal generator 610B may generate the compensation signal Vcomp having a different waveform than an input signal Vin by performing an amplification operation, a delay operation, and/or a filtering operation on the input signal Vin.

Referring to FIG. 24, unlike in the embodiments illustrated in FIGS. 22 and 23, a touch DDI chip included in a display system 600C may include a compensation signal generator 610C, a controller 620C, and a signal processor 630C. signal processor 630B may include a DAC 630C_1. Similar to the above-described embodiment, signal processor 630C may determine a value of an ambient capacitance component Camb formed in a sensing cell by analyzing a sensing signal in a non-touch period, and generate a control code Ctrl_code for controlling controller 620C in a digital manner, based on a result of the determining Controller 620C may control an amplifier, a delay, and a filter which are included in compensation signal generator 610C, in response to the control code Ctrl_code.

Figure 25:
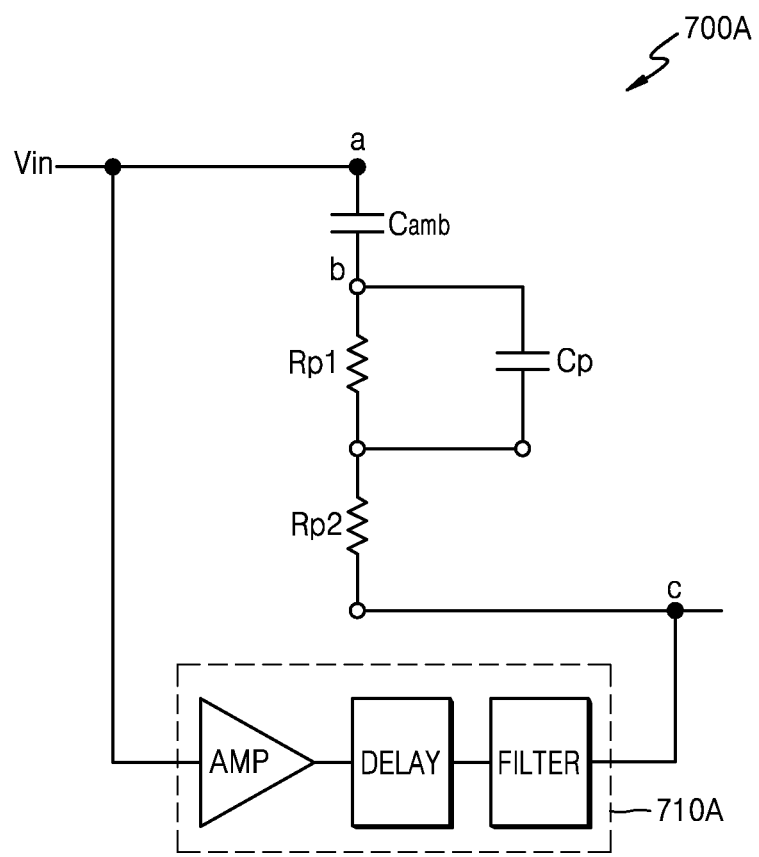
Figure 26:
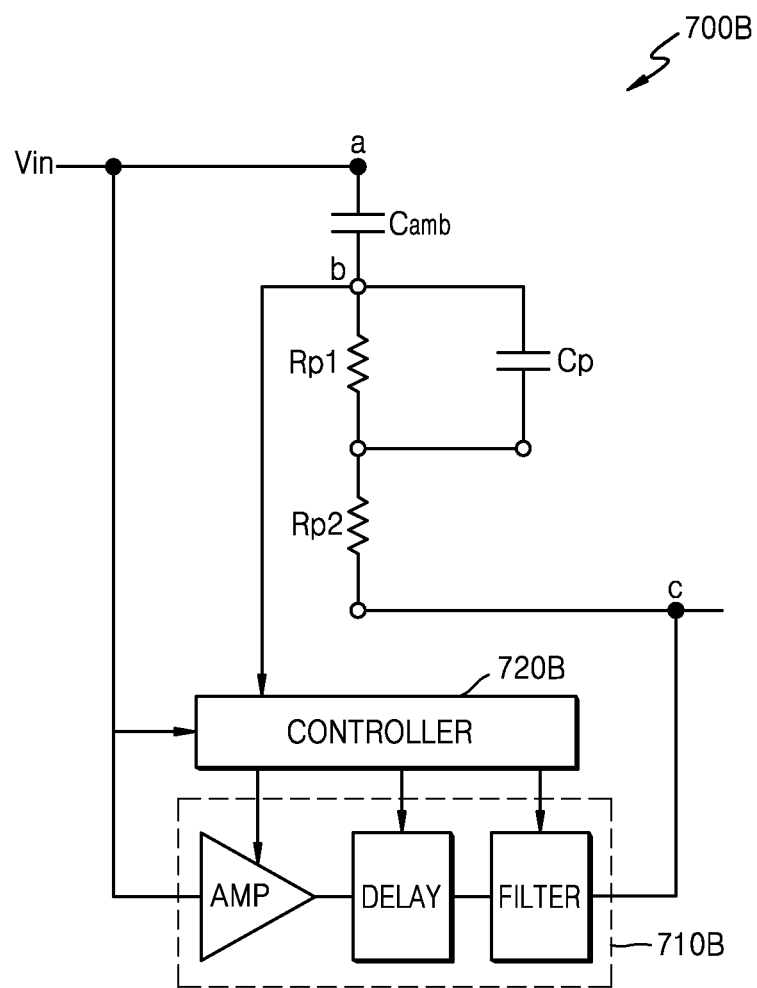
Figure 27:
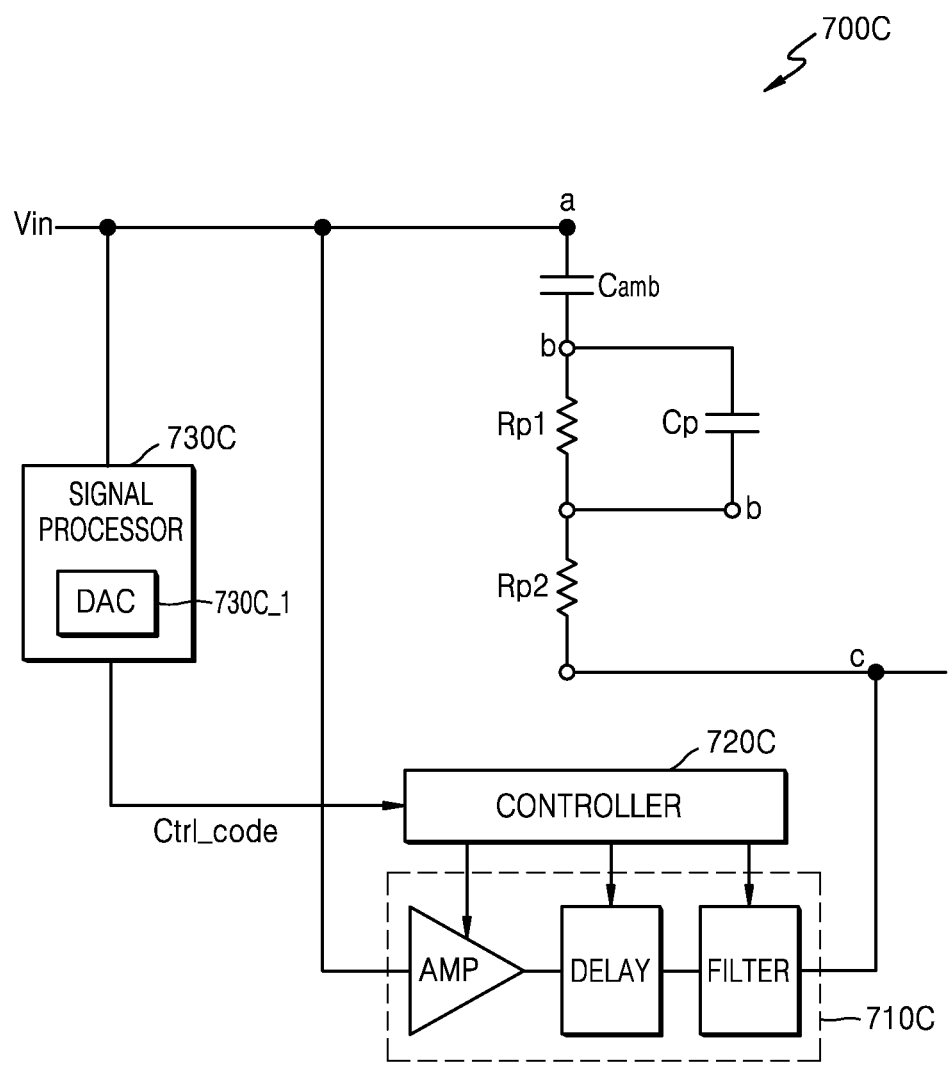

FIGS. 25 to 27 illustrate other examples of adjusting a waveform of a compensation signal. FIGS. 25 to 27 illustrate examples in which a switch is removed from a sensing cell.

Referring to FIG. 25, a display system (or a touch processing system) 700A may include a plurality of sensing cells. In each of the sensing cells, an ambient capacitance component Camb may be disposed between a first terminal a and a second terminal b, and parasitic components Rp1, Cp, and Rp2 caused by various elements may be disposed between the second terminal b and a third terminal c. Similar to the above-described embodiment, the parasitic components Rp1, Cp, and Rp2 between the second terminal b and the third terminal c may be parasitic components that are connected to the sensing unit by other various electrodes adjacent to the sensing unit other than a gate line or a data line. Alternatively, the parasitic components Rp1, Cp, and Rp2 may be RLC components generated in the gate line itself or RLC components generated in the data line itself.

The various embodiments described above may also be applied to the configuration in which the switch is not present in the sensing cell. For example, a touch DDI chip may include a compensation signal generator 710A, and compensation signal generator 710A may actively process and generate a compensation signal Vcomp taking into account the parasitic components Rp1, Cp, and Rp2. For example, a waveform of the compensation signal Vcomp capable of minimizing the value of the ambient capacitance component Camb may be selected in a certain setting mode, and compensation signal generator 710A may generate the compensation signal Vcomp through an amplification operation, a delay operation, and/or a filtering operation, based on the selected waveform of the compensation signal Vcomp. For example, in a case where the compensation signal Vcomp is provided to one terminal c of the data line, the parasitic components Rp1, Cp, and Rp2 may correspond to RLC components generated in the data line itself.

Referring to FIG. 26, unlike in the embodiment illustrated in FIG. 25, a touch DDI chip included in a display system 700B may include a compensation signal generator 710B and a controller 720B. Controller 720B may receive signals from both terminals a and b of an ambient capacitance component Camb, compare waveforms of the signals applied to both terminals a and b of the ambient capacitance component Camb, and control compensation signal generator 710A based on a result of the comparing. Under control of controller 720B, compensation signal generator 710B may generate a compensation signal Vcomp having a different waveform than an input signal Vin by performing an amplification operation, a delay operation, and a filtering operation on the input signal Vin.

Referring to FIG. 27, unlike in the embodiments illustrated in FIGS. 25 and 26, a touch DDI chip included in a display system 700C may include a compensation signal generator 710C, a controller 720C, and a signal processor 730C. Signal processor 730C may include a DAC 730C_1. Signal processor 730C may determine a value of an ambient capacitance component Camb formed in a sensing cell by analyzing a sensing signal in a non-touch period, and generate a control code Ctrl_code based on a result of the determining. Controller 720C may control an amplifier, a delay, and a filter, which are included in compensation signal generator 710C, in response to the control code Ctrl_code.

Figure 28:
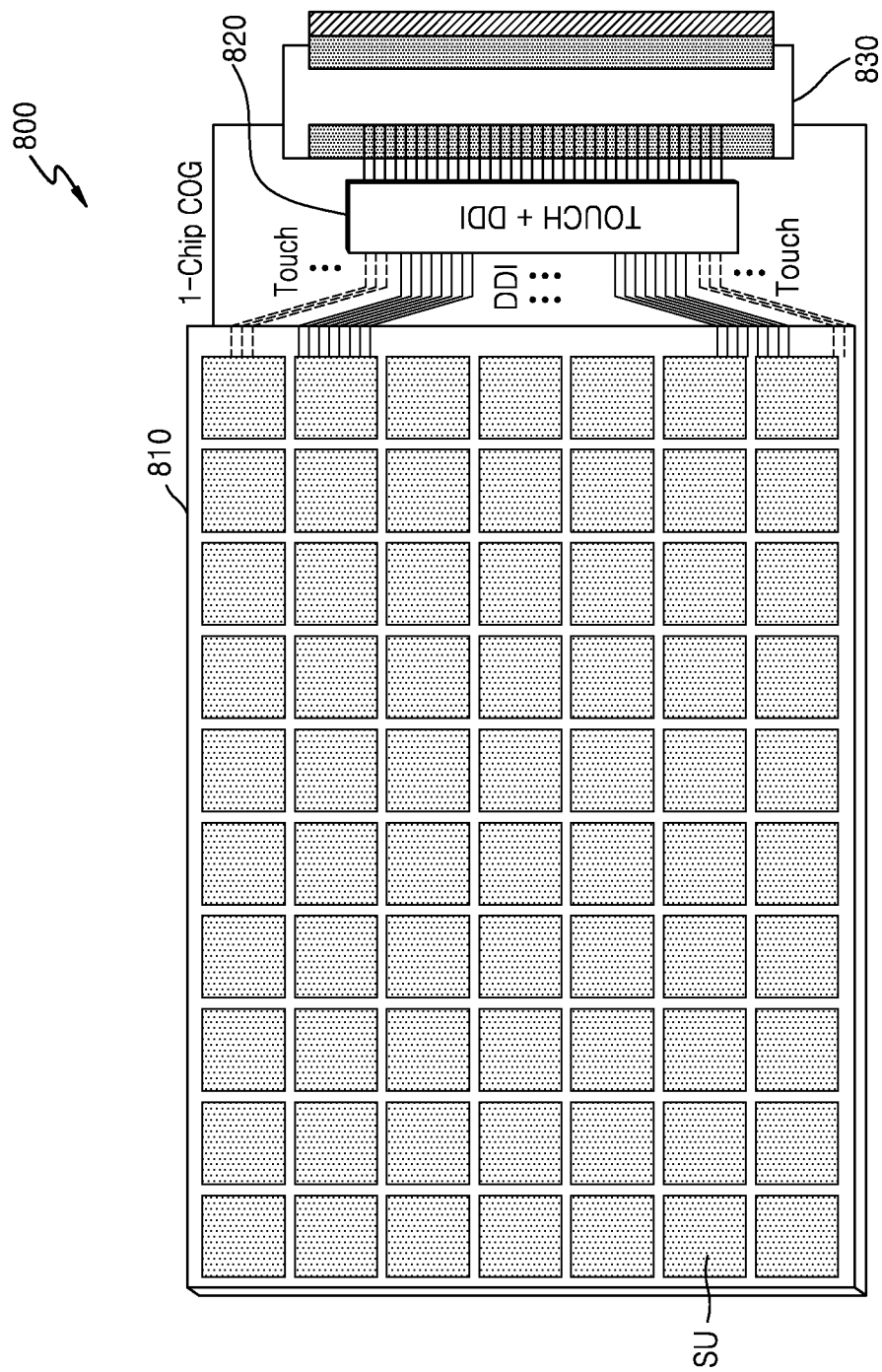
FIG. 28 is a configuration diagram of an embodiment of a display system.

FIG. 28 is a configuration diagram of an embodiment of a display system 800.

Referring to FIG. 28, display system 800 may include a display panel 810 and a touch DDI chip 820. Display panel 810 may include an in-cell type touch panel. The touch panel may include a plurality of sensing cells. Each of the plurality of sensing cells may include a sensing unit SU implemented by a common voltage (VCOM) electrode.

Touch DDI chip 820 may be mounted by using a chip on glass (COG) technique and may communicate with display panel 810 through a plurality of conductive lines. For example, touch DDI chip 820 may provide a signal for producing an image to display panel 810 and may provide the driving signal and the compensation signal described in the above embodiments to the touch panel of display panel 810. Also, touch DDI chip 820 may communicate with an external system (e.g., a host such as an application processor) through a flexible printed circuit board (FPCB) and may drive display panel 810 based on the control of the external system. An example in which touch DDI chip 820 is mounted by using the COG technique is illustrated in FIG. 28, but touch DDI chip 820 may be mounted by using other various techniques, such as a chip on flexible printed circuit or chip on film (COF).

The touch processor, the touch DDI chip including the touch processor, and the method of operating the touch processor, according to embodiments, may minimize the capacitance value at the input terminal of the sensing cell by increasing the impedance at the input terminal of the sensing cell through switch control with respect to various types of touch panels, thereby improving sensitivity and the dynamic range during touch sensing.

Also, the touch processor, the touch DDI chip including the touch processor, and the method of operating the touch processor, according to embodiments, may perform optimization processing on the driving signal, so that signals applied to both terminals of the ambient capacitance component have substantially the same waveform as each other, thereby minimizing the influence of parasitic components generated by the switch.

While the inventive concept has been particularly shown and described with reference to embodiments thereof, it will be understood that various changes in form and details may be made therein without departing from the spirit and scope of the following claims.

What is claimed is:

1. A touch processor for driving a touch panel including a sensing cell, the touch processor comprising:
    a driving circuit configured to provide a driving signal to the touch panel; and
    a capacitance controller configured to generate: a switch control signal for controlling a switch connected to a sensing unit included in the sensing cell, and at least a first compensation signal having a different waveform than the driving signal, so as to reduce a value of at least a first ambient capacitance component of the sensing cell, wherein the waveform of the first compensation signal is determined according to a parasitic component of the switch.

2. The touch processor of claim 1, wherein the capacitance controller comprises a compensation signal generator configured to receive the driving signal, and to generate the first compensation signal by performing at least one selected from an amplification operation, a delay operation, and a filtering operation on the driving signal.

3. The touch processor of claim 2, wherein:
    the first compensation signal has a different waveform than the driving signal based on a parasitic component present due to an off state of the switch, and
    the waveform of the first compensation signal is determined so that signals applied to both terminals of the first ambient capacitance component have substantially a same waveform as each other.

4. The touch processor of claim 1, wherein the switch control signal has a waveform that turns off the switch in a touch sensing period.

5. The touch processor of claim 1, wherein the touch panel corresponds to an in-cell type touch panel, the sensing unit corresponds to a common voltage electrode related to display driving of the touch panel, and the switch corresponds to a cell switch of a display cell.

6. The touch processor of claim 5, wherein:
    the capacitance controller comprises a compensation signal generator configured to perform at least one selected from among an amplification operation, a delay operation, and a filtering operation on the driving signal, and
    the compensation signal generator is configured to provide the first compensation signal to a data line for the display driving, and is further configured to generate a second compensation signal as the switch control signal, the second compensation signal being provided to a gate line for the display driving.

7. The touch processor of claim 6, wherein the compensation signal generator is configured to generate the second compensation signal having a waveform that turns off the cell switch and allows signals having substantially same waveform as each other to be applied to both terminals of a second ambient capacitance component which exists between the sensing unit and the gate line.

8. The touch processor of claim 6, wherein the compensation signal generator is configured to generate the first compensation signal having a waveform that allows signals having substantially a same waveform as each other to be applied to both terminals of the first ambient capacitance component, which exists between the sensing unit and the data line.

9. A touch display driver integrated circuit (DDI) chip for a display panel including a touch panel, the touch DDI chip comprising:
    a display driver configured to drive the display panel through at least one gate line and at least one data line; and a touch processor configured to provide a driving signal to the touch panel and generate touch information based on a sensing signal output by the touch panel, wherein the touch DDI chip provides at least a first compensation signal to the display panel, the first compensation signal having a waveform which is different than a waveform of the driving signal, and the waveform of the first compensation signal being determined according to a parasitic component of a cell switch of the display panel.

10. The touch DDI chip of claim 9, wherein the cell switch is turned off in a touch sensing period, and the waveform of the first compensation signal is determined according to the parasitic component present due to an off state of the cell switch.

11. The touch DDI chip of claim 9, wherein:

the touch processor comprises a compensation signal generator configured to generate the first compensation signal by performing at least one selected from among an amplification operation, a delay operation, and a filtering operation on the driving signal, and the first compensation signal is provided to one selected from among the gate line and the data line through the display driver.

12. The touch DDI chip of claim 11, wherein:

the touch processor comprises a controller configured to control at least one selected from among the amplification operation, the delay operation, and the filtering operation of the compensation signal generator, and the controller is further configured to control the compensation signal generator based on a comparison of waveforms of signals applied to both terminals of an ambient capacitance component formed in a sensing cell of the touch panel.

13. The touch DDI chip of claim 9, wherein:

the touch processor is further configured to provide the driving signal to the display driver, the display driver comprises a compensation signal generator configured to generate the first compensation signal by processing the driving signal, and the first compensation signal is provided to at least one selected from the gate line and the data line.

14. A device, comprising:

a driver configured to supply a driving signal to a sensing cell of a touch panel, the sensing cell being configured to detect an object that approaches or contacts the touch panel, and to provide touch information indicating detection of the object;

a switch controller configured to turn off a switch associated with the sensing cell during a period for sensing a touch of the touch panel; and a compensation signal generator configured to generate at least a first compensation signal and to apply the first compensation signal to the sensing cell such that signals applied across a first ambient capacitance component of the switching cell have substantially a same waveform as each other, so as to reduce a value of the first ambient capacitance component of the sensing cell during the period for sensing the touch of the touch panel.

15. The device of claim 14, wherein the first compensation signal has a different waveform than the driving signal to compensate for at least one parasitic component associated with the sensing cell.

16. The device of claim 15, wherein the at least one parasitic component includes at least one parasitic component of the switch associated with the sensing cell when the switch is turned off.

17. The device of claim 15, further comprising a sensing circuit configured to receive a sensing signal generated by the sensing unit in response to the driving signal, and in response to the sensing signal to produce touch data.

18. The device of claim 17, further comprising control logic configured to process the touch data to generate touch information indicating a touch or non-touch, and touch coordinates in the case of a touch, and to provide the touch information to an external host.

19. The device of claim 14, wherein the compensation signal generator is configured to provide the first compensation signal to one selected from among a gate line, a data line, and a common voltage electrode of the sensing cell.

20. The device of claim 14, wherein the compensation signal generator is further configured to generate at least a second compensation signal and to apply the second compensation signal to the sensing cell such that signals applied across a second ambient capacitance component of the switching cell have substantially a same waveform as each other, so as to reduce a value of the second ambient capacitance component of the sensing cell during the period for sensing the touch of the touch panel.

* * * * *